United States Patent
Kim et al.

(10) Patent No.: US 10,810,058 B2
(45) Date of Patent: Oct. 20, 2020

(54) METHOD FOR PROVIDING CONTENT TO USER ACCORDING TO USER'S PREFERENCE AND ELECTRONIC DEVICE THEREFOR

(71) Applicant: SAMSUNG ELECTRONICS CO., LTD., Suwon-si (KR)

(72) Inventors: Young-Hoon Kim, Seongnam-si (KR); Hee-Jun Song, Seoul (KR); Il-Hwan Choi, Yongin-si (KR); Hyun-Joong Kim, Suwon-si (KR); Hee-Seon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 52 days.

(21) Appl. No.: 16/065,929

(22) PCT Filed: Dec. 22, 2016

(86) PCT No.: PCT/KR2016/015098
§ 371 (c)(1),
(2) Date: Jun. 25, 2018

(87) PCT Pub. No.: WO2017/111496
PCT Pub. Date: Jun. 29, 2017

(65) Prior Publication Data
US 2019/0012219 A1 Jan. 10, 2019

(30) Foreign Application Priority Data
Dec. 23, 2015 (KR) .......... 10-2015-0185423

(51) Int. Cl.
G06F 9/54 (2006.01)
G06F 16/95 (2019.01)
(Continued)

(52) U.S. Cl.
CPC ............ *G06F 9/542* (2013.01); *G06F 3/0482* (2013.01); *G06F 16/00* (2019.01); *G06F 16/95* (2019.01); *H04L 67/26* (2013.01)

(58) Field of Classification Search
CPC .............................. B62M 25/04; B62M 23/06
See application file for complete search history.

(56) References Cited

U.S. PATENT DOCUMENTS 8,615,514 B1 * 12/2013 Fernandes ............. G06F 16/958
707/728
2003/0046421 A1 3/2003 Horvitz et al.
(Continued)

FOREIGN PATENT DOCUMENTS

KR 10-2010-0082073 A 7/2010
KR 10-2012-0019960 A 3/2012
(Continued)

OTHER PUBLICATIONS

Mehrotra, et al., "Designing content-driven intelligent notification mechanisms for mobile applications", 2015, Pervasive and Ubiquitous Computing, pp. 813-824, XP 058074102.
(Continued)

*Primary Examiner* — Tuan C Dao
(74) *Attorney, Agent, or Firm* — Sughrue Mion, PLLC

(57) ABSTRACT

A method for operating an electronic device according to an embodiment of the present invention may comprise: if an occurrence of a notification is detected, determining an application related to the notification or a keyword extractable from the notification; determining whether feedback of a user for the notification occurs; and storing preference information of the user for the application or the keyword based on the feedback. Also, other embodiments are possible.

16 Claims, 18 Drawing Sheets

(51) Int. Cl.
*G06F 16/00* (2019.01)
*G06F 3/0482* (2013.01)
*H04L 29/08* (2006.01)

(56) References Cited

U.S. PATENT DOCUMENTS

| | | | |
|---|---|---|---|
| 2004/0267740 | A1* | 12/2004 | Liu .................... G06F 16/5838 |
| 2005/0091674 | A1 | 4/2005 | Knight et al. |
| 2011/0060996 | A1 | 3/2011 | Alberth, Jr. et al. |
| 2012/0047129 | A1* | 2/2012 | Redstone ................ H04L 67/18 707/723 |
| 2013/0339345 | A1 | 12/2013 | Soto Matamala et al. |
| 2014/0226025 | A1 | 8/2014 | Han |
| 2014/0280582 | A1* | 9/2014 | Aylesworth ............ H04L 51/32 709/204 |
| 2014/0351744 | A1* | 11/2014 | Jeon .................... G06F 3/0482 715/781 |
| 2014/0372423 | A1 | 12/2014 | Majumder et al. |
| 2015/0302338 | A1* | 10/2015 | Zaveri .................. H04L 51/32 705/7.39 |
| 2015/0341900 | A1* | 11/2015 | Jeong ................... H04W 68/02 455/458 |

FOREIGN PATENT DOCUMENTS

| | | |
|---|---|---|
| KR | 10-2013-0059738 A | 6/2013 |
| KR | 10-2013-0117556 A | 10/2013 |
| KR | 10-2014-0096643 A | 8/2014 |
| KR | 10-2014-0102391 A | 8/2014 |
| KR | 10-2014-0116342 A | 10/2014 |
| KR | 10-2015-0066644 A | 6/2015 |
| WO | 2015/184359 A2 | 12/2015 |

OTHER PUBLICATIONS

Communication dated Jul. 19, 2018, issued by the European Patent Office in counterpart European Patent Application No. 16879363.6.
Search Report dated Mar. 29, 2017, issued by the International Searching Authority in counterpart International Patent Application No. PCT/KR2016/015098 (PCT/ISA/210).
Written Opinion dated Mar. 29, 2017, issued by the International Searching Authority in counterpart International Patent Application No. PCT/KR2016/015098 (PCT/ISA/237).

* cited by examiner (a)

↓ pkgName - com.kakao.talk
tickerText - IU: HAVE YOU LISTENED TO MY SONG?
time - 1437521734
event - posted (b)

(c)

↓ pkgName - com.coupang.mobile
tickerText - WITCH FACTORY CLEANSING CREAM HALF PRICE:
GET BABY SOFT SKIN ONLY WITH CLEANSING CREAM!
3RD FLOOR, WITCH FACTORY...
time - 1437521735
event - removed (d)

1410

| CATEGORY | PREFERRED NOTIFICATION INFORMATION |
|---|---|
| NEWS | - CATEGORY → ECONOMY, WORLD, SCIENCE, IT<br>- PEOPLE (ACTORS/ACTRESSES, SINGERS, COMEDIANS, ETC.) →<br>  IU, Yoo Ah-in, Sul Kyung-gu<br>- COMPANIES → Samsung, Facebook, Apple, Twitter<br>- TV PROGRAM → MUHANDOJUN, Samsiseki, Umakjungsim<br>- MOVIES → Assassination, Veteran, Ant-Man |
| SHOPPING | - CATEGORY → FASHION, FURNITURE, HOME APPLIANCES,<br>             COMPUTERS, FOOD<br>- PRODUCT NAME → Samsung 24 LED monitor,<br>                 Jeonggwanjang Red Ginseng Extract Limited |
| MOVIE | - MOVIES OF INTEREST → Assassination, Veteran, Ant-Man<br>- GENRE → SF, HORROR, COMEDY, ROMANCE |
| GAME | - GAME OF INTEREST → Clash of Clans, Friends Pop, Line Pop 2<br>- GAME GENRE → ACTION, MMORPG, SHOOTING GAMES |
| EATING OUT | - RESTAURANT OF INTEREST → Mies Container Gangnam,<br>                            Bongpiyang Gangnam Station |
| TRAVEL/<br>ACCOMMODATION | - FAVORITE TOURIST DESTINATION → Jeju Island, Sokcho, Cebu, Beijing<br>- PREFERRED SERVICE TYPE<br>  (ACCOMMODATION, FLIGHT, PACKAGE TOUR) |

| CATEGORY | APPLICATION FILENAME | TOTAL COUNT | EXECUTE | DELETE | PREFERENCE |
|---|---|---|---|---|---|
| NEWS | kr.psynet.yhnews | 15 | 10 | 5 | 5 |
| NEWS | com.saltlux.zinynews | 12 | 5 | 7 | -2 |
| SHOPPING | com.interpark.shop | 10 | 0 | 0 | 0 |
| ... | ... | ... | ... | ... | ... |

| CATEGORY | TOTAL COUNT | EXECUTE | DELETE | PREFERENCE |
|---|---|---|---|---|
| POLITICS | 11 | 10 | 1 | 9 |
| ENTERTAINMENT | 11 | 5 | 6 | -1 |
| ECONOMY | 10 | 0 | 0 | 0 |
| ... | ... | ... | ... | ... |

| CATEGORY | TOTAL COUNT | EXECUTE | DELETE | PREFERENCE |
|---|---|---|---|---|
| IU | 13 | 13 | 0 | 13 |
| Infinite challenge | 20 | 16 | 4 | 12 |
| ... | ... | ... | ... | ... |

FIG.15C

METHOD FOR PROVIDING CONTENT TO USER ACCORDING TO USER'S PREFERENCE AND ELECTRONIC DEVICE THEREFOR

CROSS-REFERENCE TO RELATED APPLICATION

This application is a National Phase Entry of PCT International Application No. PCT/KR2016/015098, which was filed on Dec. 22, 2016, and claims priority to Korean Patent Application No. 10-2015-0185423, which was filed on Dec. 23, 2015, the contents of which are incorporated herein by reference.

BACKGROUND

1. Field

The present disclosure relates to a method for providing content to a user according to the user's preference and an electronic device therefor.

2. Description of Related Art

With the development of transmission and storage technologies for various A/V media in recent years, the amount of content that users can access is exponentially increasing. Particularly, due to the introduction of digital broadcasting and internet infrastructure and higher capacity of various A/V devices, users can enjoy numerous contents regardless of time and place.

In particular, a recent trend is to utilize services that analyze user's interest and recommend content. Through such a content-providing service, content can be provided that users may be interested in without any user request for various categories.

SUMMARY

The quality of a service that provides content to a user according to the result of analyzing the user's interest is determined based on how accurately the user's interest is determined. However, since current content-providing services analyze only fragmentary elements, such as e-mails, text messages, and a search history, it is difficult to consider that a user's interest is accurately identified.

An aspect of the present disclosure is to provide a method for preferentially providing content preferred by a user according to the user's preference by collecting and analyzing information about content in which the user is interested, and an electronic device therefor.

An operation method of an electronic device according to one embodiment of the present disclosure may include: determining an application related to a notification or a keyword extractable from the notification, when the occurrence of the notification is detected; determining whether feedback on the notification from a user occurs; and storing preference information of the user for the application or the keyword on the basis of the feedback.

An electronic device according to one embodiment of the present disclosure may include a memory; and a processor configured to determine an application related to a notification or a keyword extractable from the notification, when occurrence of the notification is detected, to determine whether feedback on the notification from a user occurs, and to store preference information of the user for the application or the keyword in the memory on the basis of the feedback.

According to one embodiment of the present disclosure, a storage medium may store commands, wherein the commands may be configured for at least one processor to perform at least one operation when executed by the at least one processor, the at least one operation including: determining an application related to a notification or a keyword extractable from the notification, when the occurrence of the notification is detected; determining whether feedback on the notification from a user occurs; and determining preference of the user for the application or the keyword on the basis of the feedback.

The present disclosure may provide a method for preferentially providing pieces of content preferred by a user according to the user's preference by collecting and analyzing information about pieces of content in which the user is interested, and an electronic device therefor.

BRIEF DESCRIPTION OF THE DRAWINGS

FIG. 14 illustrates information on a user-preferred notification by category according to various embodiments;

FIGS. 15A to 15C illustrate preference by category or by keyword according to various embodiments;

DETAILED DESCRIPTION

Figure 1:
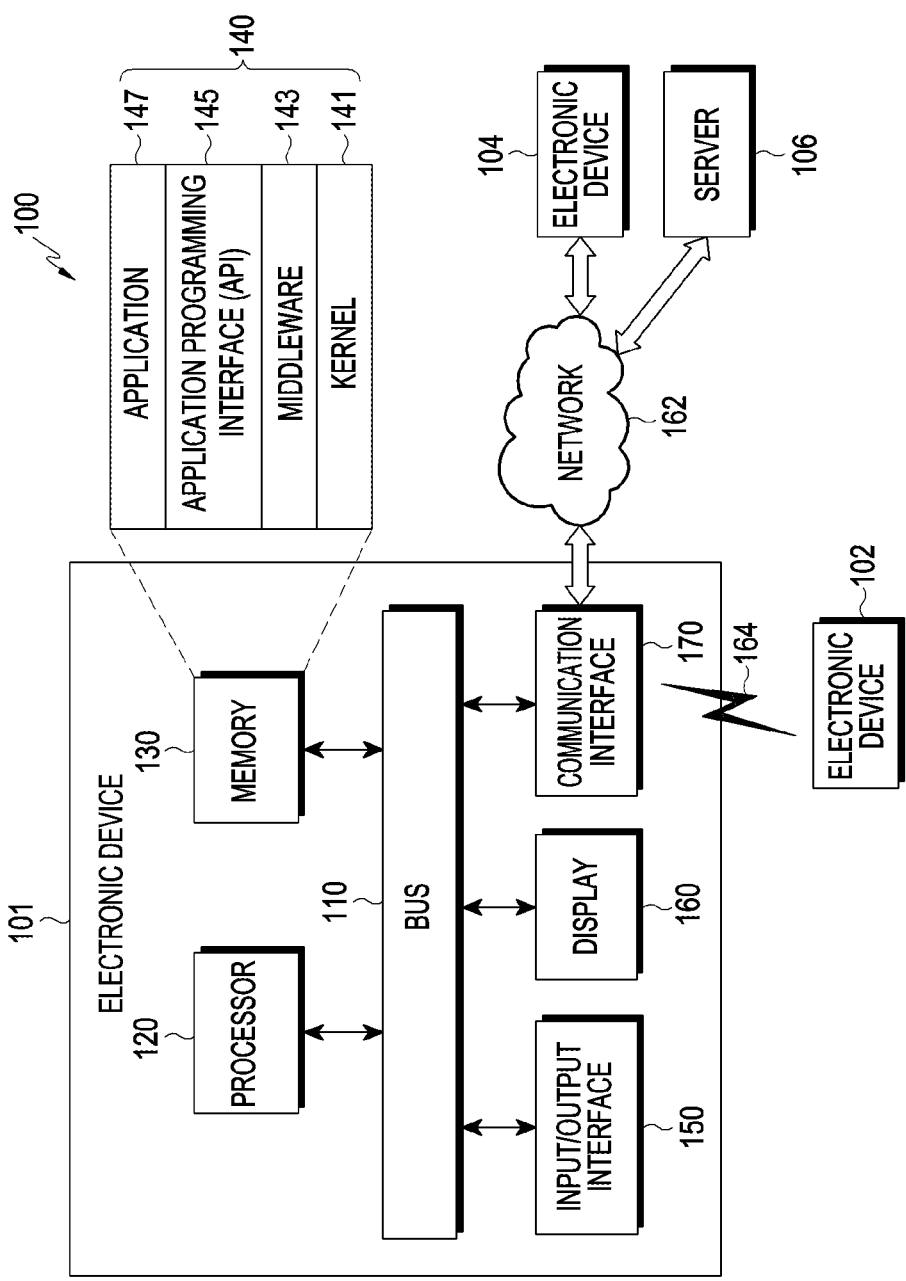
FIG. 1 illustrates a network environment including an electronic device according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

Throughout the specification, the expressions "A or B," "at least one of A or/and B," "one or more of A or/and B," and the like may include all combinations of the listed items. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). Conversely, when one component element is "directly coupled" or "directly connected" to another component element, it may be construed that a third component element does not exist between the first component element and the second component element.

The expression "configured (or set) to", used in this specification, may be interchangeably used with, for example, "suitable for," "having the capacity to," "designed to," "adapted to," "made to," or "capable of" according to circumstances. The term "configured to" may not necessarily imply "specifically designed to" in hardware. Instead, in some cases, the expression "device configured to" may mean that the device "can ~" together with other devices or components. For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates a network environment including an electronic device according to various embodiments. FIG. 1 illustrates an electronic device 101 in a network environment 100 according to various embodiments.

The electronic device 101 may include a bus 110, a processor 120, a memory 130, an input/output interface 150, a display 160, and a communication interface 170. In some embodiments, at least one of the components may be omitted, or additional components may be further included in the electronic device 101.

The bus 110 may include, for example, a circuit that connects the components 120 to 170 to each other and delivers communications (for example, control messages and/or data) between the components.

The processor 120 may include one or more of a Central Processing Unit (CPU), an Application Processor (AP), and a Communication Processor (CP). The processor 120 may control, for example, at least one different component of the electronic device 101, and/or may perform operations relating to communication or data processing.

According to one embodiment, the processor 120 may analyze one or more notification occurring in the electronic device 101. The processor 120 may identify an application related to a notification, for example, an application where the notification occurs. Further, the processor 120 may extract one or more keywords from the notification. Each notification may include one or more words. The processor 120 may extract at least one from words forming the notification as a keyword.

The processor 120 may monitor feedback on each of the one or more notifications from a user. The processor 120 may monitor whether feedback on each notification from the user, for example, a user input for checking a notification (or a user input for executing a notification), a user input for deleting a notification that has not been checked, or a user input for deleting a checked notification, is input to the electronic device 101.

The processor 120 may generate or update preference information on the user using the electronic device 101 on the basis of the monitoring result. According to one embodiment, the processor 120 may generate a preference DB (not shown) that stores the preference information or may update the preference DB.

The processor 120 may determine preference for notifications, an application related to a notification, or a keyword extracted from a notification on the basis of the monitoring result. For example, when a notification related to a first application occurs and the notification is checked (executed) by the user, the processor 120 may increase preference for the application related to the notification and preference for a keyword extractable from the notification. For example, when a notification related to a second application occurs and the notification is deleted without being checked by the user, the processor 120 may reduce preference for the application related to the notification and preference for a keyword extractable from the notification.

When a notification occurs, the processor 120 may control the electronic device 101 to display a first graphic element related to the notification. The first graphic element may include, for example, part of the notification (for example, an image, text, or a sound). The electronic device 101 may receive a user input for selecting the first graphic element, and the processor 120 may control the electronic device 101 to display a second graphic element related to the notification in response to the user input. The second graphic element may include, for example, part of the notification (for example, an image, text, or a sound). According to one embodiment, the processor 120 may execute a corresponding application so that the second graphic element is displayed according to the user input of selecting the first graphic element. That is, the second graphic element may be displayed on the corresponding application. According to one embodiment, the first graphic element may be a cropped part of the second graphic element.

As the second graphic element is displayed according to the user input for selecting the first graphic element, the notification may be checked (or executed) by the user of the electronic device 101.

The processor 120 may control the display 160 to display notifications, for example, a first graphic element or a second graphic element, according to the user's preference. For example, the processor 120 may control the display 160 to preferentially display notifications generated from an application having a high user preference to notifications generated from an application having a relatively low preference.

According to one embodiment, the processor 120 may determine whether to receive content transmitted from an external device (for example, the electronic device 102 or 104 or the server 106) according to the user's preference, thereby filtering content received from the external device. For example, when content related to an application or a keyword with a high user preference is transmitted from the external device, the processor 120 may control the electronic device 101 to receive and display the content. For example, when content related to an application or a keyword with a low user preference is transmitted from the external device, the processor 120 may control the electronic device 101 not to receive the content or to immediately delete the content even though receiving the content.

The memory 130 may include a volatile and/or nonvolatile memory. The memory 130 may store, for example, a command or data related to at least one different component of the electronic device 101. According to one embodiment, the memory 130 may store software and/or a program 140. According to one embodiment, the memory 130 may be configured in a form including a preference DB.

The program 140 may include, for example, a kernel 141, middleware 143, an Application Programming Interface (API) 145, and/or an application (or "app") 147. At least part of the kernel 141, the middleware 143, and the API 145 may be designated as an Operating System (OS).

The kernel 141 may control or manage system resources (for example, the bus 110, the processor 120, the memory 130, or the like) used to perform an operation or function implemented in other programs (for example, the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data.

Further, the middleware 143 may process one or more requests for operations received from the application 147 according to the priority thereof. For example, the middleware 143 may assign at least one application 147 a priority for using a system resource of the electronic device 101 (for example, the bus 110, the processor 120, the memory 130, or the like). For example, the middleware 143 may process the one or more requests for operations according to the priority assigned to the at least one application, thereby performing scheduling or load balancing for the one or more requests for operations.

The API 145 is, for example, an interface for the application 147 to control a function provided from the kernel 141 or the middleware 143, and may include, for example, at least one interface or function (for example, a command) for file control, window control, image processing, or text control.

The input/output interface 150 may serve as an interface that delivers a command or data, which is input from, for example, a user or a different external device, to a different component(s) of the electronic device 101. Further, the input/output interface 150 may output a command or data, which is received from a different component(s) of the electronic device 101, to the user or to the different external device.

The display 160 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 160 may display, for example, various types of content (for example, text, an image, a video, an icon, a symbol, or the like) for the user. The display 160 may include a touch screen and may receive touch, gesture, proximity, or hovering input using, for example, an electronic pen or a body part of a user.

The communication interface 170 may establish communication, for example, between the electronic device 101 and an external device (for example, a first external electronic device 102, a second external electronic device 104, or a server 106). For example, the communication interface 170 may be connected to a network 162 via wireless communication or wired communication to communicate with the external device (for example, the second external electronic device 104 or the server 106).

The wireless communication may use, for example, a cellular communication protocol, which may be, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). Further, the wireless communication may include, for example, short-range communication 164. The short-range communication 164 may include, for example, at least one of Wireless Fidelity (Wi-Fi), Bluetooth, Near-Field Communication (NFC), and Global Navigation Satellite System (GNSS). The GNSS may include, for example, at least one of a Global Positioning System (GPS), a Global Navigation Satellite System (GNSS), a BeiDou Navigation Satellite System (hereinafter, "BeiDou"), and Galileo, which is the European global satellite-based navigation system, depending on the use area or bandwidth. In the present document, "GPS" may be interchangeably used with "GNSS" hereinafter. The wired communication may include, for example, at least one of Universal Serial Bus (USB), High-Definition Multimedia Interface (HDMI), Recommended Standard 232 (RS-232), and Plain Old Telephone Service (POTS). The network 162 may include a telecommunications network, which may be, for example, at least one of a computer network (for example, a Local Area Network (LAN) or Wide Area Network (WAN)), the Internet, and a telephone network.

Each of the first and second external electronic devices 102 and 104 may be a device of a type that is the same as, or different from, that of the electronic device 101. According to one embodiment, the server 106 may include a group of one or more servers. According to various embodiments, all or some of the operations performed in the electronic device 101 may be performed in another electronic device or a plurality of electronic devices (for example, the electronic devices 102 and 104 or the server 106). According to one embodiment, when the electronic device 101 needs to perform a function or service automatically or upon request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional functions and may transmit the result thereof to the electronic device 101. The electronic device 101 may provide the requested function or service using the same received result or after additionally processing the result. To this end, cloud-computing, distributed-computing, or client-server-computing technologies may be used.

An electronic device according to one embodiment of the present disclosure may include a memory; and a processor configured to determine an application related to a notification or a keyword extractable from the notification, when occurrence of the notification is detected, to determine whether feedback on the notification from a user occurs, and to store preference information of the user for the application or the keyword in the memory on the basis of the feedback.

Figure 2:
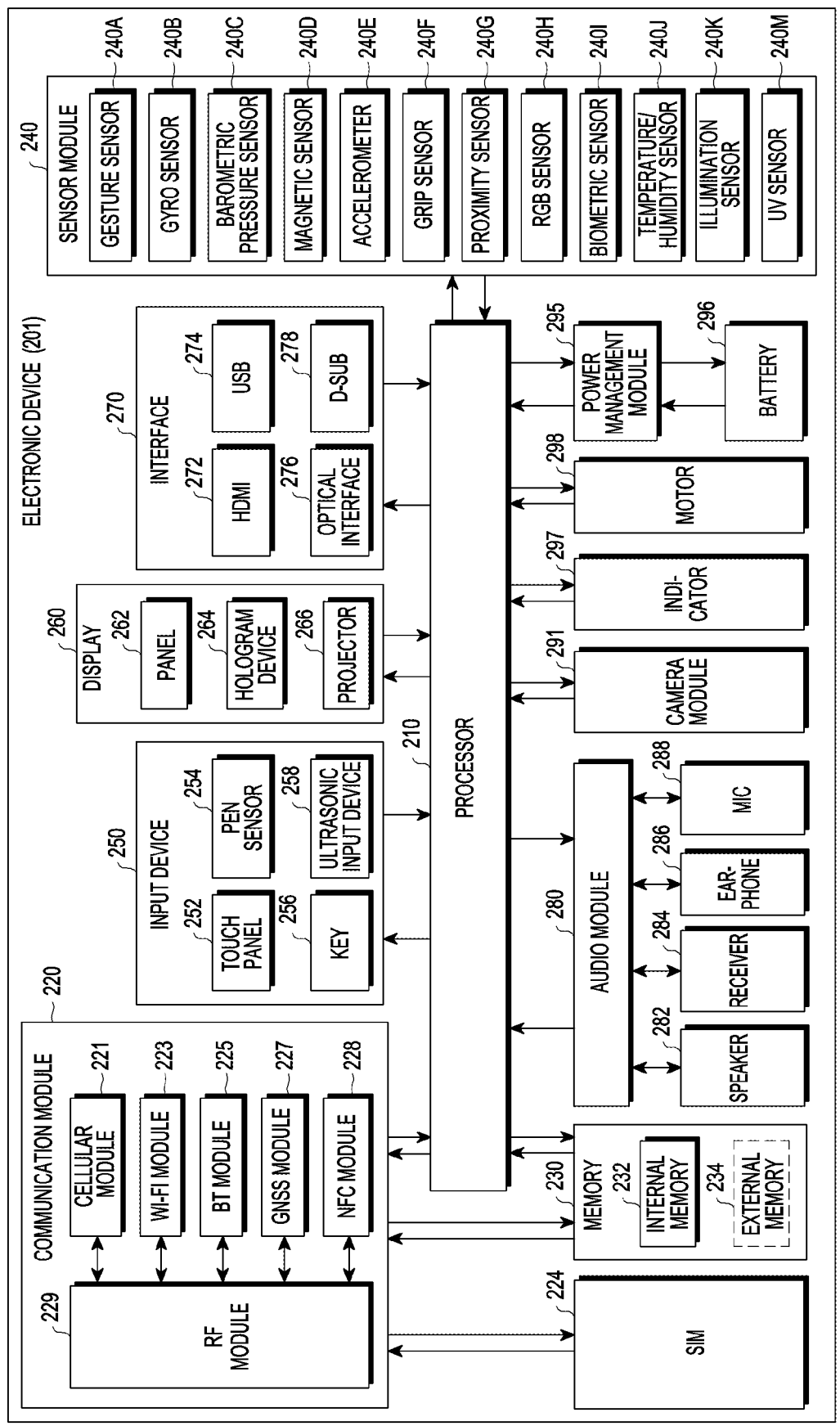
FIG. 2 is a block diagram illustrating an electronic device according to various embodiments.

FIG. 2 is a block diagram illustrating an electronic device according to various embodiments.

The electronic device 201 may include, for example, all or part of the electronic device 101 illustrated in FIG. 1. The electronic device 201 may include one or more processors (for example, Application Processors (APs)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processors 210 may run, for example, an operating system or an application to control a plurality of hardware or software components that are connected to the processors 210, and may perform various kinds of data processing and operations. The processors 210 may be configured as, for example, a System on Chip (SoC). According to one embodiment, the processors 210 may further include a Graphic Processing Unit (GPU) and/or an image signal processor. The processors 210 may include at least some (for example, a cellular module 221) of the components illustrated in FIG. 2. The processors 210 may load a command or data received from at least one of other components (for example, nonvolatile memory) into volatile memory to process the command or data, and may store various types of data in the nonvolatile memory.

The communication module 220 may have a configuration that is the same as, or similar to, that of the communication face 170 in FIG. 1. The communication module 220 may include, for example, a cellular module 221, a Wi-Fi module 223, a Bluetooth module 225, a global navigation satellite system (GNSS) module 227 (for example, a global positioning system (GPS) module, a GLONASS module, a BeiDou module, or a Galileo module), a Near-Field Communication (NFC) module 228, and a radio frequency (RF) module 229.

The cellular module 221 may provide, for example, a voice call, a video call, a text messaging service, or an Internet service through a communication network. According to one embodiment, the cellular module 221 may perform identification and authentication of the electronic device 201 in a communication network using a Subscriber Identity Module (SIM, for example, a SIM card) 224. According to one embodiment, the cellular module 221 may perform at least some of the functions provided by the processors 210. According to one embodiment, the cellular module 221 may include a Communication Processor (CP).

The Wi-Fi module 223, the Bluetooth module 225, the GNSS module 227, and the NFC module 228 may each include a processor to process data transmitted and received via the respective modules. According to one embodiment, at least some (for example, two or more) of the cellular module 221, the Wi-Fi module 223, the Bluetooth module 225, the GNSS module 227, and the NFC module 228 may be included in one Integrated Chip (IC) or IC package.

The RF module 229 may transmit and receive, for example, a communication signal (for example, an RF signal). The RF module 229 may include, for example, a transceiver, a Power Amplifier (amp) Module (PAM), a frequency filter, a Low-Noise Amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module.

The SIM 224 may include, for example, a card including a SIM and/or an embedded SIM, and may include unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random-Access Memory (DRAM), a Static RAM (SRAM), a Synchronous Dynamic RAM (SDRAM), or the like) and a nonvolatile memory (for example, a One-Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, an NAND flash, an NOR flash, or the like), a hard drive, or a Solid-State Drive (SSD)).

The external memory 234 may further include a flash drive, for example, a Compact Flash (CF), a Secure Digital (SD), a micro Secure Digital (micro-SD), a mini Secure Digital (mini-SD), an extreme digital (xD), a Multi-Media Card (MMC), a memory stick, or the like. The external memory 234 may be functionally and/or physically connected to the electronic device 201 through any of various interfaces.

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, and an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor configured, as a part of the processors 210 or separately from the processors 210, to control the sensor module 240, thereby controlling the sensor module 240 while the processors 210 are in a sleep state.

The input device 250 may include, for example, a touch panel 252, a (digital) pen sensor 254, a key 256, or an ultrasonic input device 258. The touch panel 252 may be, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or may include a separate recognition sheet. The key 256 may include, for example, a physical button, an optical key, or a keypad. The ultrasonic input device 258 may detect ultrasonic waves generated in an input tool through a microphone (for example, a microphone 288) and may identify data corresponding to the detected ultrasonic waves.

The display 260 (for example, the display 160) may include a panel 262, a hologram device 264, or a projector 266. The panel 262 may include a configuration that is the same as, or similar to, that of the display 160 of FIG. 1. The panel 262 may be configured, for example, to be flexible, transparent, or wearable. The panel 262 may be formed with the touch panel 252 in a single module. The hologram device 264 may display a three-dimensional image in the air using light interference. The projector 266 may project light onto a screen to display an image. The screen may be disposed, for example, inside or outside the electronic device 201. According to one embodiment, the display 260 may further include a control circuit to control the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) interface 278. The interface 270 may be included, for example, in the communication interface 170 illustrated in FIG. 1. Additionally or alternatively, the interface 270 may include, for example, a Mobile High-Definition Link (MHL) interface, a Secure Digital (SD) card/Multi-Media Card (MMC) interface, or an Infrared Data Association (IrDA) interface.

The audio module 280 may bidirectionally convert, for example, a sound and an electrical signal. At least some components of the audio module 280 may be included, for example, in the input/output interface 150 illustrated in FIG.

1. The audio module 280 may process sound information input or output, for example, through a speaker 282, a receiver 284, earphones 286, or the microphone 288.

The camera module 291 is a device that takes, for example, a still image and a video. According to one embodiment, the camera module 291 may include one or more image sensors (for example, a front sensor or a rear sensor), a lens, an Image Signal Processor (ISP), or a flash (for example, an LED, a xenon lamp, or the like).

The power management module 295 may manage, for example, the power of the electronic device 201. According to one embodiment, the power management module 295 may include a Power Management Integrated Circuit (PMIC), a charger Integrated Circuit (IC), or a battery or fuel gauge. The PMIC may have wired and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 may display the specific state of the electronic device 201 or a component thereof (for example, the processors 210), which may be, for example, a booting state, a message state, or a charging state. The motor 298 may convert an electrical signal into mechanical vibrations, and may generate vibrations or a haptic effect. Although not shown, the electronic device 201 may include a processing device for supporting a mobile TV (for example, a GPU). The processing device for supporting the mobile TV may process media data in accordance with Digital Multimedia Broadcasting (DMB), Digital Video Broadcasting (DVB), or mediaFlo™ standards.

Each element mentioned in the present document may include one or more components, and may be designated by different terms depending on the type of the electronic device. In various embodiments, an electronic device may be configured by including at least one element mentioned in the present document and may be configured such that some elements are omitted or additional elements are further included. Further, an electronic device may be configured such that some of the elements of an electronic device according to various embodiments are combined into one entity, which may perform the same functions as those of the corresponding elements before combination.

Figure 3:
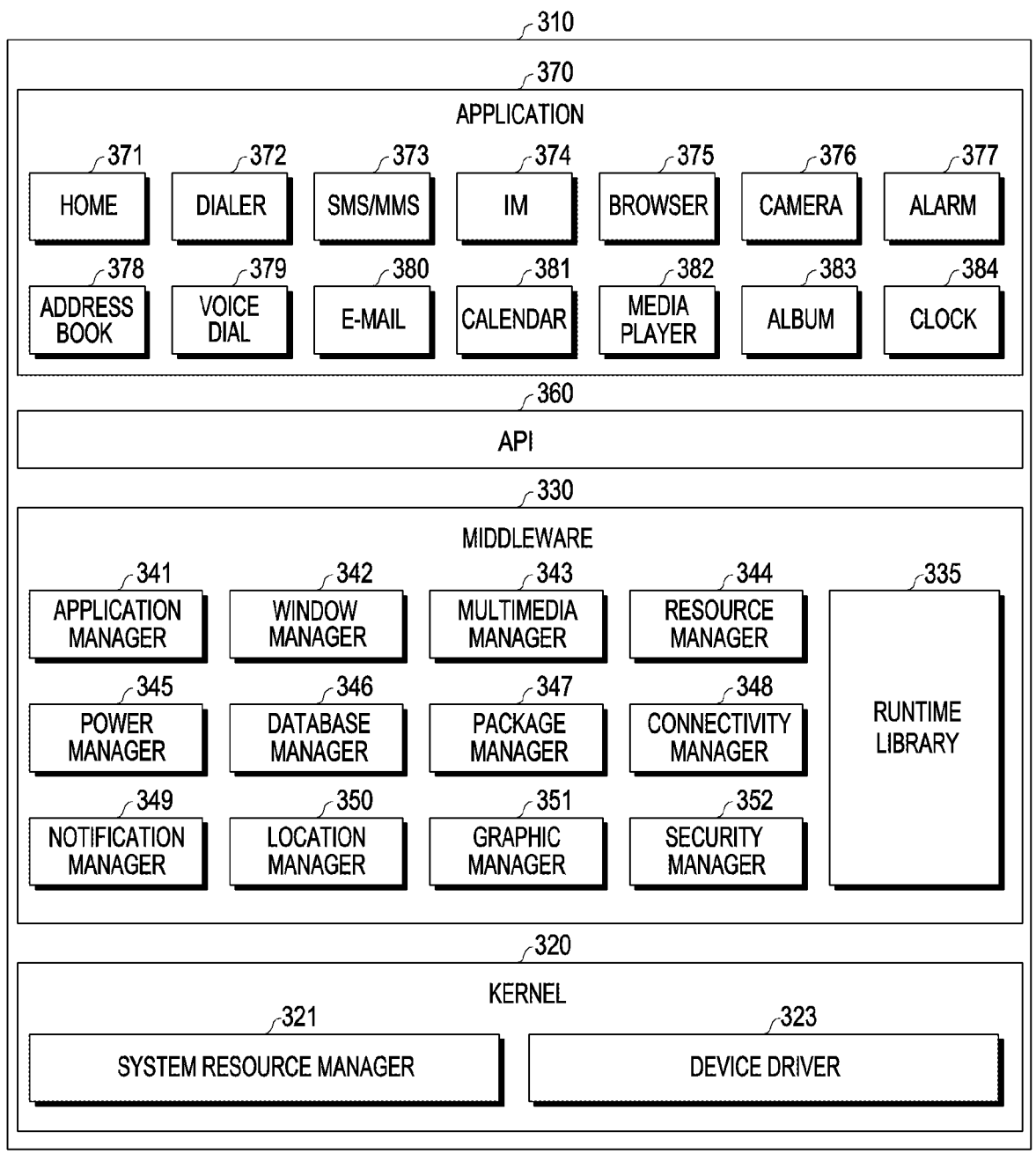
FIG. 3 is a block diagram illustrating a program module according to various embodiments.

FIG. 3 is a block diagram illustrating a program module according to various embodiments.

According to one embodiment, the program module 310 (for example, the program 140) may include an Operating System (OS) that controls resources related to an electronic device (for example, the electronic device 101) and/or various applications (for example, the application 147) that run on the OS. The OS may be, for example, Android, iOS, Windows, Symbian, Tizen, Bada, or the like.

The program module 310 may include a kernel 320, middleware 330, an API 360, and/or an application 370. At least part of the program module 310 may be preloaded onto the electronic device, or may be downloaded from an external electronic device (for example, the electronic device 102 or 104, the server 106, or the like).

The kernel 320 (for example, the kernel 141) may include, for example, a system resource manager 321 and/or a device driver 323. The system resource manager 321 may perform control, allocation, or recovery of system resources. According to one embodiment, the system resource manager 321 may include a process management unit, a memory management unit, or a file-system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, functions commonly needed for applications 370, or may provide the applications 370 with various functions through the API 360 so that the applications 370 may efficiently use the limited systems resources in the electronic device. According to one embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier to add a new function through a programming language while the application 370 is running. The runtime library 355 may perform functions for input/output management, memory management, or arithmetic functions.

The application manager 341 may manage, for example, the life cycle of at least one application among the applications 370. The window manager 342 may manage graphic user interface (GUI) resources used for a screen. The multimedia manager 343 may identify formats that are necessary to play various media files, and may encode or decode a media file using a codec suitable for a corresponding format. The resource manager 344 may manage resources, such as a source code, a memory, or a storage space, for at least one application among the applications 370.

The power manager 345 may operate with, for example, a basic input/output system (BIOS) to manage a battery or power supply and may provide information on power necessary for operation of the electronic device. The database manager 346 may generate, retrieve, or change a database to be used for at least one application among the applications 370. The package manager 347 may install or update an application distributed in the form of a package file.

The connectivity manager 348 may manage wireless connectivity via, for example, Wi-Fi or Bluetooth. The notification manager 349 may display or report an incoming message, an appointment, and an event including a proximity notification in a manner that does not disturb a user. The location manager 350 may manage position information on the electronic device. The graphic manager 351 may manage a graphic effect to be provided for the user or a user interface related to the graphic effect. The security manager 352 may provide overall security functions necessary for system security or user authentication. According to one embodiment, when the electronic device (for example, the electronic device 101) has phone features, the middleware 330 may further include a telephony manager to manage a voice or video call function of the electronic device.

The middleware 330 may include a middleware module that forms combinations of various functions of the foregoing components. The middleware 330 may provide a specialized module for each type of OS in order to provide differentiated functions. Further, the middleware 330 may dynamically delete some of the existing components or add new components.

The API 360 (for example, the API 145) is, for example, a set of API programming functions, and may be provided with a different configuration depending on the OS. For example, one API set for each platform may be provided in the case of Android or iOS, while two or more API sets for each platform may be provided in the case of Tizen.

The application 370 (for example, the application 147) may include one or more applications that are capable of performing functions of, for example, a home screen 371, a dialer 372, SMS/MMS 373, instant messaging (IM) 374, a browser 375, a camera 376, an alarm 377, an address book 378, a voice dialer 379, email 380, a calendar 381, a media player 382, an album 383, a clock 384, or health care (for example, for measuring exercising or blood sugar), an environmental data application (for example, for providing atmospheric pressure, humidity, or temperature data), or the like.

According to one embodiment, the application 370 may include an application (hereinafter, "information exchange application" for convenience of description) that supports information exchange between the electronic device (for example, the electronic device 101) and an external electronic device (for example, the electronic device 102 or 104). The information exchange application may include, for example, a notification relay application for relaying specific information to the external electronic device or a device management application for managing the external electronic device.

For example, the notification relay application may include a function of relaying notification information, which is generated in another application (for example, an SMS/MMS application, an email application, a health care application, an environmental data application, or the like) of the electronic device, to the external electronic device (for example, the electronic device 102 or 104). Additionally, the notification relay application may receive notification information, for example, from the external electronic device and may provide the notification information to the user.

The device management application may manage (for example, install, delete, or update), for example, at least one function (for example, a function of turning on/turning off the external electronic device itself (or some components) or adjusting the brightness (or resolution) of a display) of the external electronic device (for example, the electronic device 102 or 104) communicating with the electronic device, an application operating in the external electronic device, or a service (for example, a call service or message service) provided by the external electronic device.

According to one embodiment, the application 370 may include an application (for example, a health care application of a mobile medical device) assigned according to the attributes of the external electronic device (for example, the electronic device 102 or 104). According to one embodiment, the application 370 may include an application received from the external electronic device (for example, the server 106 or the electronic device 102 or 104). According to one embodiment, the application 370 may include a preloaded application or a third-party application that may be downloaded from a server. The illustrated components of the program module 310, according to the embodiments, may be termed differently depending on the OS.

According to various embodiments, at least part of the program module 310 may be implemented in software, firmware, hardware, or combinations of at least two or more thereof. At least part of the program module 310 may be implemented (for example, run) by, for example, a processor (for example, the processor 210). At least part of the program module 310 may include, for example, a module, a program, a routine, sets of instructions, or a process to perform one or more functions.

Figure 4:
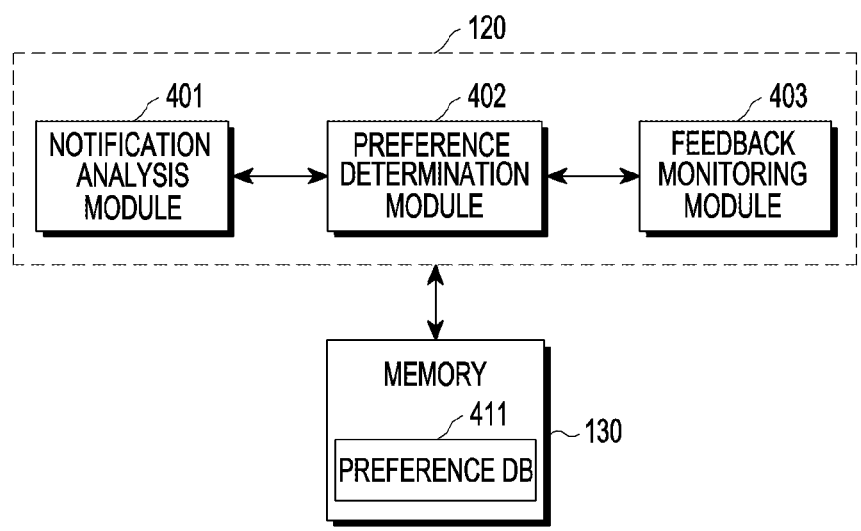
FIG. 4 is a block diagram illustrating the configuration of a processor included in an electronic device according to various embodiments.

FIG. 4 is a block diagram illustrating the configuration of a processor included in an electronic device according to various embodiments.

Referring to FIG. 4, the processor 120 may include at least one of a notification analysis module 401, a preference determination module 402, and a feedback monitoring module 403.

The notification analysis module 401 may analyze a notification that occurs in the electronic device 101. When a notification occurs, the notification analysis module 401 may identify an application where the notification occurs and may extract one or more keywords from the notification. According to one embodiment, the notification analysis module 401 may determine (decide) the category (for example, address book, news, shopping, or the like) of the application where the notification occurs or may determine (decide) the category (for example, address book, news, shopping, or the like) of each of the one or more keywords extracted from the notification.

The preference determination module 402 may determine (decide) preference for each notification and may update a preference DB 411 included in a memory 130 on the basis of the determined preference. The preference DB 411 may store preference by application or preference by keyword. According to one embodiment, when a notification is checked (or executed) by a user, the preference determination module 402 may increase preference for an application related to the notification, a category including the application, or one or more keywords extractable from the notification. According to one embodiment, when a notification is deleted without being checked (executed) by the user, the preference determination module 402 may reduce preference for an application related to the notification or a keyword extractable from the notification.

According to one embodiment, the preference determination module 402 may control a display 160 to display graphic elements, for example, first graphic elements or second graphic elements, related to notifications according to the user's preference. For example, the preference determination module 402 may control the display 160 to preferentially display notifications generated from an application having a high user preference to notifications generated from an application having a relatively low preference. For example, when a list of first graphic elements respectively related to two or more different notifications is displayed on the display 160, the preference determination module 402 may determine the sort order of the first graphic elements according to the user's preference.

According to one embodiment, the preference determination module 402 may determine whether to receive content transmitted from an external device (for example, the electronic device 102 or 104 or the server 106) according to the user's preference, thereby filtering content received from the external device. For example, when content related to an application or a keyword with a high user preference is transmitted from the external device, the preference determination module 402 may control the electronic device 101 to receive and display the content. For example, when content related to an application or a keyword with a low user preference is transmitted from the external device, the preference determination module 402 may control the electronic device 101 not to receive the content or to immediately delete the content even though receiving the content.

According to one embodiment, preference for each notification, preference for an application related to the notification, or preference for a keyword, which is determined by the preference determination module 402, may be stored in the preference DB 411 of the memory 130.

The feedback monitoring module 403 may monitor feedback on each of one or more notifications from the user. The feedback monitoring module 403 may monitor whether feedback on each notification from the user, for example, a user input for checking a notification (or a user input for executing a notification), a user input for deleting a notification that has not been checked, or a user input for deleting a checked notification, is input to the electronic device 101.

Figure 5:
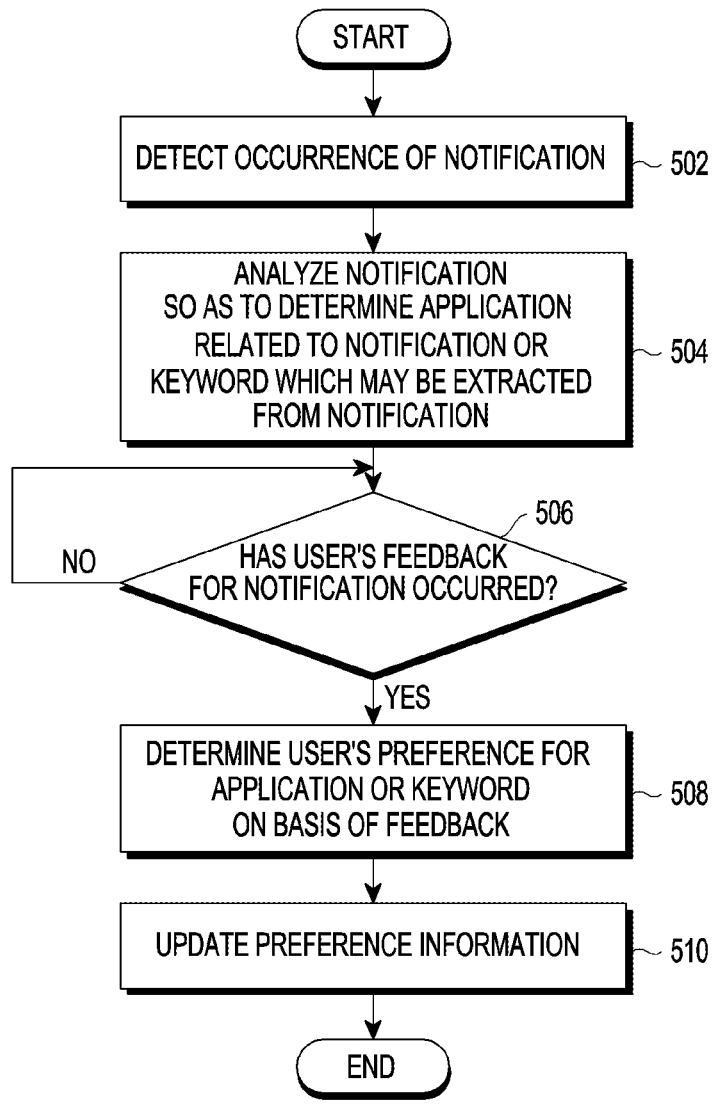
FIG. 5 is a flowchart illustrating a method for an electronic device to determine a user's preference according to various embodiments.

FIG. 5 is a flowchart illustrating a method for an electronic device to determine a user's preference according to various embodiments.

Referring to FIG. 5, in operation 502, the processor 120 of the electronic device 101 may detect the occurrence of a notification. When the notification is generated, the processor 120 of the electronic device 101 may analyze the generated notification. In operation 504, the processor 120 of the electronic device 101 may analyze the notification and may determine an application related to the notification or a keyword extractable from notification. For example, when the notification is a notification generated from a shopping application, the processor 120 of the electronic device 101 may determine the category of the notification to be 'Shopping'. When the notification is related to, for example, 'Buy Running Shoes', the processor 120 may extract 'Running Shoes' as a keyword from the notification.

In operation 506, the processor 120 of the electronic device 101 may determine whether a user's feedback on the notification occurs. When the user's feedback on the notification does not occur in operation 506 (No in 506), the processor 120 of the electronic device 101 may control the electronic device 101 to maintain a current state.

When the user's feedback on the notification occurs in operation 506 (Yes in 506), the processor 120 of the electronic device 101 may determine the user's preference for the application or keyword on the basis of the feedback in operation 508. For example, in operation 508, the processor 120 may determine whether the user's preference for the application or keyword is high or low on the basis of the user's feedback. Further, the processor 120 may determine whether preference for the application or keyword related to the notification is low or high on the basis of the user's determined preference.

In operation 510, the processor 120 of the electronic device 101 may update preference information on the basis of the preference determined in operation 508. For example, in operation 510, the processor 120 may reflect the preference determined in operation 508 in preference information on the application or keyword, thereby updating the preference information. The processor 120 may update the preference DB 411 using the updated preference information.

An operation method of an electronic device according to one embodiment of the present disclosure may include: determining an application related to a notification or a keyword extractable from the notification, when the occurrence of the notification is detected; determining whether feedback on the notification from a user occurs; and storing preference information of the user for the application or the keyword on the basis of the feedback.

Figure 6:
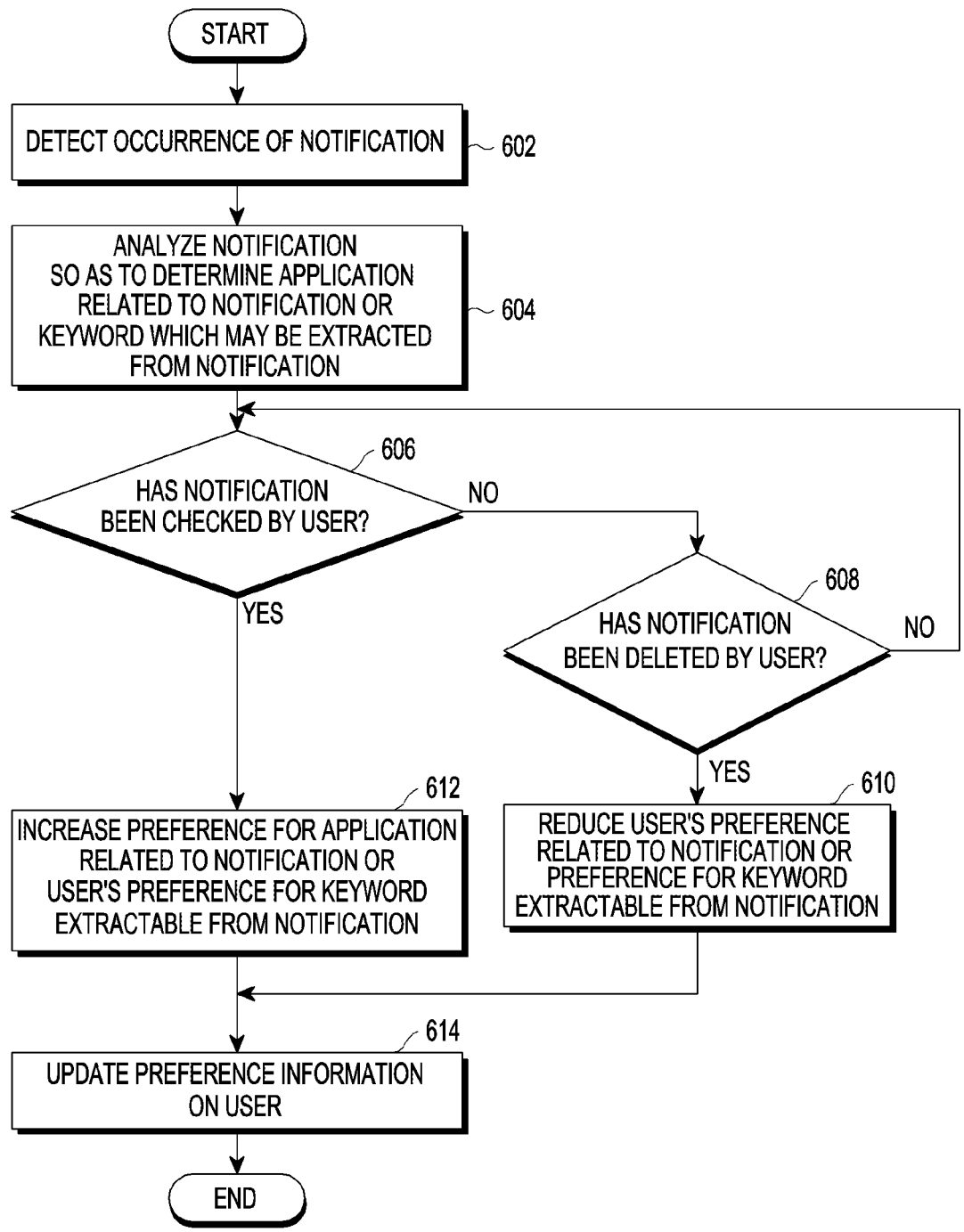
FIG. 6 is a flowchart illustrating a method for an electronic device to determine a user's preference according to various embodiments.

FIG. 6 is a flowchart illustrating a method for an electronic device to determine a user's preference according to various embodiments.

Referring to FIG. 6, in operation 602, the processor 120 of the electronic device 101 may detect the occurrence of a notification. When the notification is generated, the processor 120 of the electronic device 101 may analyze the generated notification and may determine an application related to the notification or a keyword extractable from notification in operation 604.

In operation 606, the processor 120 of the electronic device 101 may determine whether the notification is checked (executed) by a user of the electronic device 101. When the notification is checked by the user in operation 606 (Yes in 606), the processor 120 of the electronic device 101 may increase preference for the application related to the notification or for the keyword extractable from the notification in operation 612.

In operation 614, the processor 120 of the electronic device 101 may update preference information (or the preference DB 411) of the user. For example, the processor 120 may reflect the result of increasing the preference for the application or keyword in operation 612 in the preference information, thereby updating the preference information (or the preference DB 411). For example, it is assumed that the user's preference for each application can be expressed as any of 1 to 100 and a greater number indicates a higher preference. Further, assuming that the preference for the application before operation 612 is '35', the processor 120 may increase the preference for the application to '36' in operation 612. In operation 614, the processor 120 may reflect the result of increasing the preference for the application to '36' in preference information previously stored in the memory 130, thereby updating the preference information.

When the notification is not checked by the user in operation 606 (No in 606), the processor 120 may determine whether the notification is deleted by the user in operation 608. When the notification is not deleted by the user in operation 608 (No in 608), the processor 120 of the electronic device 101 may maintain a current state until the notification is checked or deleted by the user. When the notification is deleted by the user in operation 608 (Yes in 608), that is, when the notification is deleted by the user without being checked, the processor 120 of the electronic device 101 may reduce the preference for the application related to the deleted notification or the user's preference for the keyword extractable from the notification in operation 610.

In operation 614, the processor 120 of the electronic device 101 may update the preference information of the user. For example, the processor 120 may reflect the result of decreasing the preference for the application in operation 610 in the preference information, thereby updating the preference information (or preference DB 411). In the previous example, assuming that the preference for the application before the operation 610 is '35', the processor 120 may reduce the preference for the application to '34' in operation 610. In operation 610, the processor 120 may reflect the result of decreasing the preference for the application to '34' in preference information previously stored in the memory 130, thereby updating the preference information.

Figure 7:
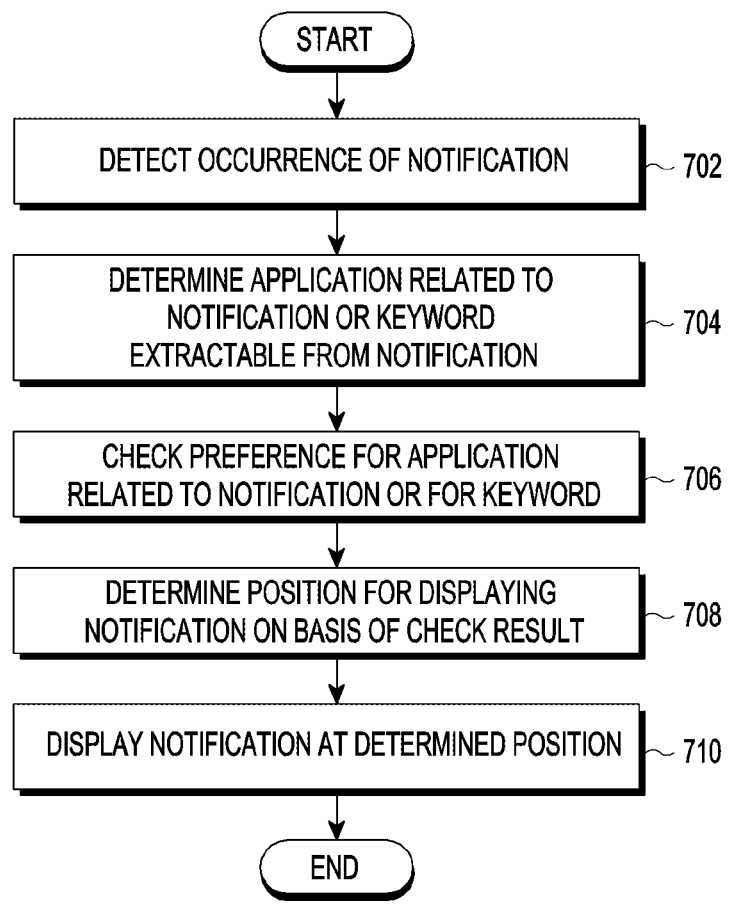
FIG. 7 is a flowchart illustrating a method for an electronic device to determine a user's preference according to various embodiments.

FIG. 7 is a flowchart illustrating a method for an electronic device to determine a user's preference according to various embodiments.

Referring to FIG. 7, in operation 702, the processor 120 of the electronic device 101 may detect the occurrence of a notification. When the notification is generated, the processor 120 of the electronic device 101 may analyze the generated notification and may determine an application related to the notification or a keyword extractable from notification in operation 704.

In operation 706, the processor 120 of the electronic device 101 may check preference for the application related to the notification or preference for the keyword. In operation 706, the processor 120 may determine the preference for the application or the preference for the keyword with reference to preference information or the preference DB 411.

In operation 708, the processor 120 of the electronic device 101 may determine a position for displaying the notification, for example, a first graphic element or a second graphic element related to the notification, on the basis of a check result in operation 706. In operation 710, the processor 120 of the electronic device 101 may control the display 160 to display the notification at the position determined in operation 708. For example, assuming that a list of first graphic elements including the first graphic element related to the notification is displayed, the processor 120 may control the display 160 to display the first graphic element related to the notification at the position determined in operation 708. For example, assuming that the second graphic element related to the notification is displayed, the processor 120 may control the display 160 to display the second graphic element at the position determined in operation 708.

According to one embodiment, the processor 120 may control the display 160 to preferentially display a notification, for example, a first graphic element or a second graphic element, related a high-preference application or keyword. For example, the processor 120 may display the notification related to the high-preference application or keyword to be distinguished from other notifications. For example, assuming that the display 160 displays a list of one or more first graphic elements, the processor 120 may display the display 160 to display the first graphic element related to the high-preference application or keyword at the top of the list. For example, the processor 120 may control the display 160 to display a first graphic element related to a low-preference application or keyword at the bottom of the list.

Figure 8:
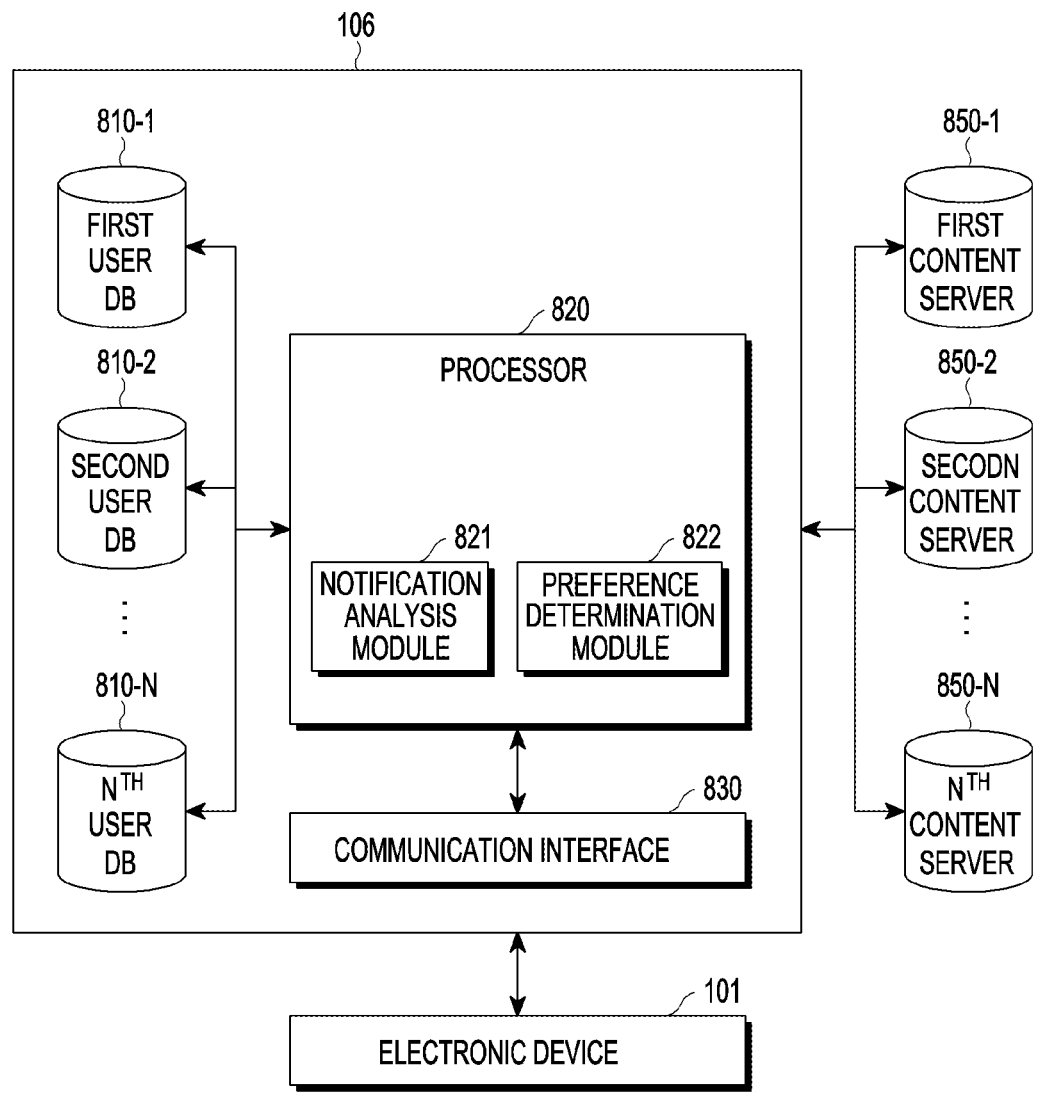
FIG. 8 is a block diagram illustrating a server according to various embodiments.

FIG. 8 is a block diagram illustrating a server according to various embodiments.

Referring to FIG. 8, the server 106 may include user DBs 810-1, 810-2, . . . , and 810-N, a processor 820, and a communication interface 830.

The processor 820 may generate and store preference information on each user. According to one embodiment, the processor 820 may generate and manage a user DB including preference information on each user, for example, a first user DB 810-1, a second user DB 810-2, . . . , and an Nth user DB 810-N. According to one embodiment, the processor 820 may perform the same operations as the processor 120 of the electronic device 101. The processor 820 may be configured in a form including a notification analysis module 821 and a preference determination module 822.

The notification analysis module 821 may analyze a notification that occurs in an electronic device 101. When a notification occurs, the electronic device 101 may transmit the notification or feedback on the notification from a user to the server 106. The notification analysis module 821 may identify an application where the notification occurs and may extract one or more keywords from the notification. According to one embodiment, the notification analysis module 821 may determine the category (for example, address book, news, shopping, or the like) of the application where the notification occurs or may determine the category (for example, address book, news, shopping, or the like) of each of the one or more keywords extracted from the notification.

The preference determination module 822 may analyze notifications and feedback on each notification from the user, thereby determining preference of the user of the electronic device (for example, the electronic device 101) where a corresponding notification occurs. The preference determination module 822 may update a user DB (for example, the first user DB 810-1, the second user DB 810-2, . . . , and the Nth user DB 810-N) for the user of the electronic device on the basis of the preference. Each of the user DBs 810-1, 810-2, . . . , and 810-N may store preference of the user by application or preference of the user by keyword.

According to one embodiment, when a notification is checked (or executed) by the user, the preference determination module 822 may increase preference for an application related to the notification, a category including the application, or one or more keywords extractable from the notification. According to one embodiment, when a notification is deleted without being checked (executed) by the user, the preference determination module 822 may reduce preference for an application related to the notification or a keyword extractable from the notification.

The communication interface 830 may perform a communication function of the server 106. According to one embodiment, the communication interface 830 may receive, from the electronic device 101, a request for the user's preference for an application related to a notification occurring in the electronic device 101 or a keyword extractable from the notification. When the user's preference for the application related to the notification or the keyword extractable from the notification is determined, the communication interface 830 may transmit preference information on the preference to the electronic device 101.

According to one embodiment, the server 106 may be connected with one or more content servers 850-1, 850-2, . . . , and 850-N. The processor 820 may transmit content preferred by user to a corresponding electronic device (for example, the electronic device 101, 102, or 104) by referring to each of the user DBs 810-1, 810-2, . . . , and 810-N. According to another embodiment, in order to connect a content server capable of providing content preferred by a particular user among the content servers 850-1, 850-2, . . . , and 850-N with an electronic device of the particular user, the processor 820 of the server 106 may control the electronic device or the content server.

According to another embodiment, each of the one or more content servers 850-1, 850-2, . . . , and 850-N may be connected to the electronic device 101 and may receive preference information on the user of the electronic device 101 from the electronic device 101. Each of the one or more content servers 850-1, 850-2, . . . , and 850-N may provide content preferred by the user to the electronic device 101 on the basis of the preference information.

For example, it is assumed that the user carrying the electronic device 101 goes to a department store to buy a desired product. Further, it is assumed that a first content server 850-1 is installed in the department store. When the electronic device 101 is located in a range (for example, inside the department store) where short-range communication with the first content server 850-1 is enabled, the first content server 850-1 may request the electronic device 101 to transmit preference information. When the electronic device 101 transmits preference information on the user to the first content server 850-1 according to the request, the first content server 850-1 may transmit information on one or more products preferred by the user among products sold at the department store, for example, the location of a product, the price of a product, and a coupon applicable to the purchase of a product, to the electronic device 101.

Figure 9:
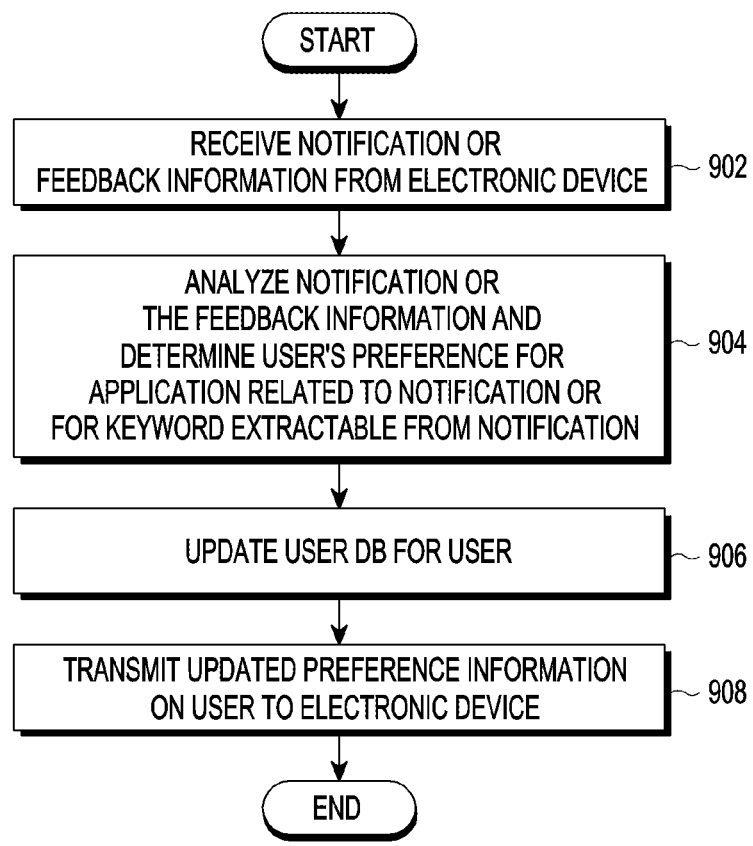
FIG. 9 is a flowchart illustrating a method for a server to determine a user's preference according to various embodiments.

FIG. 9 is a flowchart illustrating a method for a server to determine a user's preference according to various embodiments.

Referring to FIG. 9, in operation 902, the communication interface 830 of the server 106 may receive, from the electronic device 101, a notification occurring in the electronic device 101 or feedback information indicating feedback on the notification. In operation 904, the processor 820 of the server 106 may analyze the notification or the feedback information, thereby determining preference of the user of the electronic device 101 for an application related to the notification or preference for a keyword extractable from the notification. For example, in operation 904, the processor 820 of the server 106 may determine an application in which the notification occurs. In addition, the processor 820 may determine the user's preference for the application related to the notification or for the keyword extractable from the notification through the feedback information. For example, when the notification has been checked by, the user, the processor 820 may increase the user's preference for the application related to the notification or for the keyword extractable from the notification. For example, when the notification has been deleted without being checked by the user, the processor 820 may reduce the user's preference for the application related to the notification or for the keyword extractable from the notification.

In operation 906, the processor 820 of the server 106 may update a user DB for the user (for example, the first user DB 810-1, the second user DB 810-2, . . . , and the Nth user DB 810-N), The user DB (for example, the first user DB 810-1, the second user DB 810-2, . . . , and the Nth user DB 810-N) may store preference information on the user in a database form. In operation 906, the processor 820 may increase or reduce the preference for the application related to the notification or for the keyword extractable from the notification, that is, update the preference information on the user, thereby updating the user DB (for example, the first user DB 810-1, the second user DB 810-2, . . . , and the Nth user DB 810-N).

According to one embodiment, in operation 908, the processor 820 of the server 106 may control the communication interface 830 to transmit the updated preference information on the user to the electronic device 101. The processor 120 of the electronic device 101 may receive the preference information updated by the server 106, may store the updated preference information in the memory 130, and may control the electronic device 101 according to the updated preference information.

Figure 10:
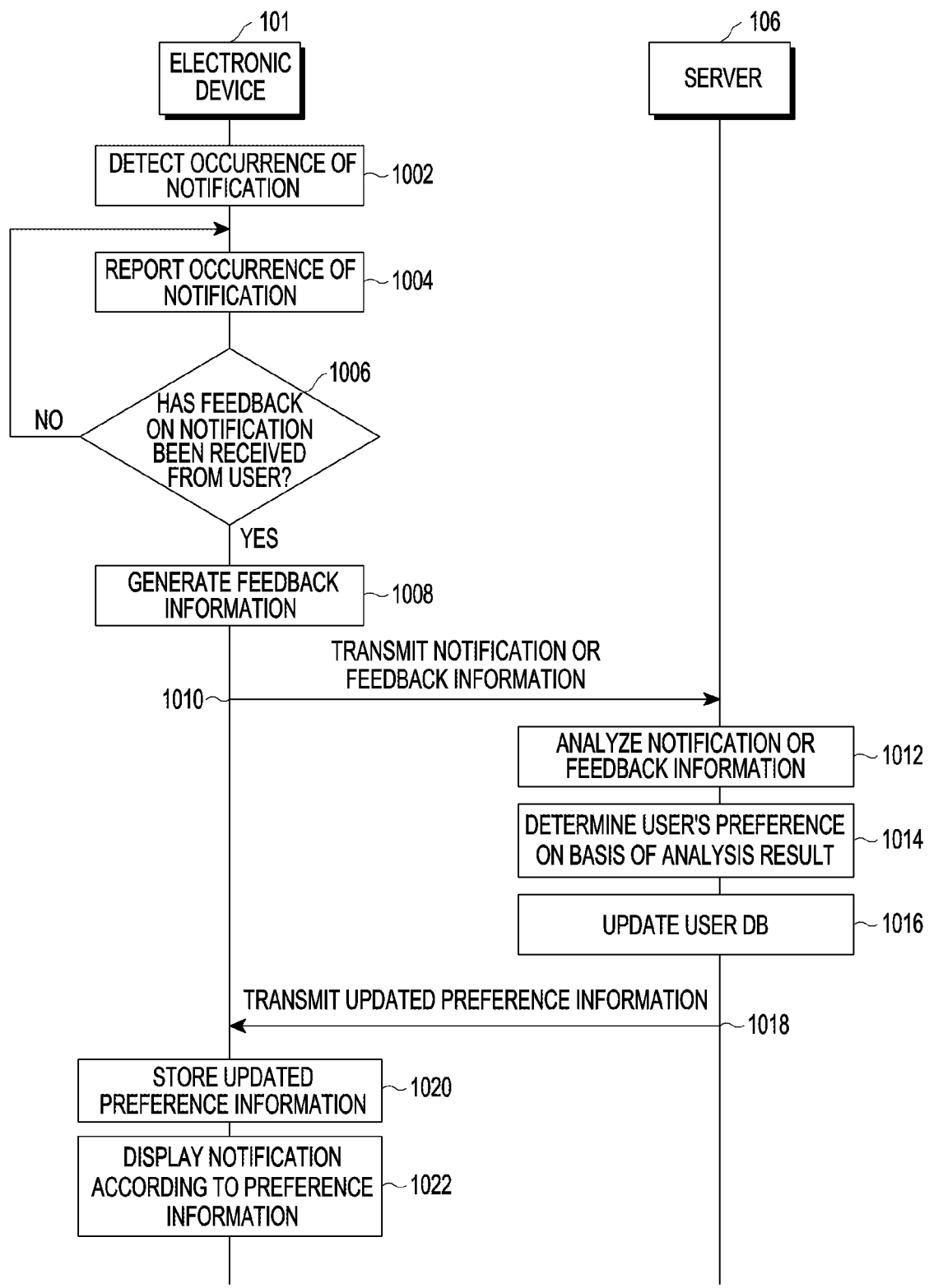
FIG. 10 is a flowchart illustrating a method for an electronic device and a server to determine a user's preference according to various embodiments.

FIG. 10 is a flowchart illustrating a method for an electronic device and a server to determine a user's preference according to various embodiments.

Referring to FIG. 10, the processor 120 of the electronic device 101 may sense the occurrence of a notification in operation 1002. When the notification occurs, the processor 120 of the electronic device 101 may report that the notification has occurred in operation 1004. According to one embodiment, at operation 1004, the processor 120 may report the occurrence of the notification to the user of the electronic device 101 via the display 160 or a speaker (for example, the speaker 282).

In operation 1006, the processor 120 of the electronic device 101 may determine whether feedback on the notification is received from the user. When it is determined that no feedback on the notification is received from the user in operation 1006 (No in operation 1006), the processor 120 of the electronic device 101 may control the electronic device 101 to maintain a current state of reporting the occurrence of the notification (1004).

When it is determined that feedback on the notification is received from the user in operation 1006 (Yes in operation 1006), the processor 120 of the electronic device 101 may generate information on the feedback, that is, feedback information, in operation 1008.

In operation 1010, the electronic device 101 may transmit the notification or the feedback information to the server 106 via the communication interface 170. In operation 1012, the processor 820 of the server 106 may analyze the notification or the feedback information. In operation 1012, the processor 820 may determine an application related to the notification or may extract one or more keywords from the notification. Further, in operation 1012, the processor 820 may analyze the feedback information to determine what the feedback on the notification from the user is.

In operation 1014, the processor 820 of the server 106 may determine (decide) preference of the user of the electronic device 101 for an application related to the notification or preference for a keyword extractable from the notification on the basis of an analysis result obtained by analyzing the notification or the feedback information. For example, when the notification is checked by the user, the processor 820 may increase the user's preference for the application related to the notification or for the keyword extractable from the notification. For example, when the notification is deleted without being checked by the user, the processor 820 may reduce the user's preference for the application related to the notification or the keyword extractable from the notification.

In operation 1016, the processor 820 of the server 106 may update a user DB for the user (for example, the first user DB 810-1). The user DB may store preference information on the user. In operation 1016, the processor 820 may increase or reduce the preference for the application related to the notification or for the keyword extractable from the notification, that is, update the preference information on the user. Further, the processor 820 may update the user DB for the user using the updated preference information.

According to one embodiment, in operation 1018, the processor 820 of the server 106 may control the communication interface 830 to transmit the updated preference information on the user to the electronic device 101. In operation 1020, the processor 120 of the electronic device 101 may store the updated preference information, received from the server 106 in operation 1018, in the memory 130. According to one embodiment, in operation 1022, the processor 120 of the electronic device 101 may control the electronic device 101 to display notifications generated after operation 1020 in accordance with the updated preference information.

Figure 11:
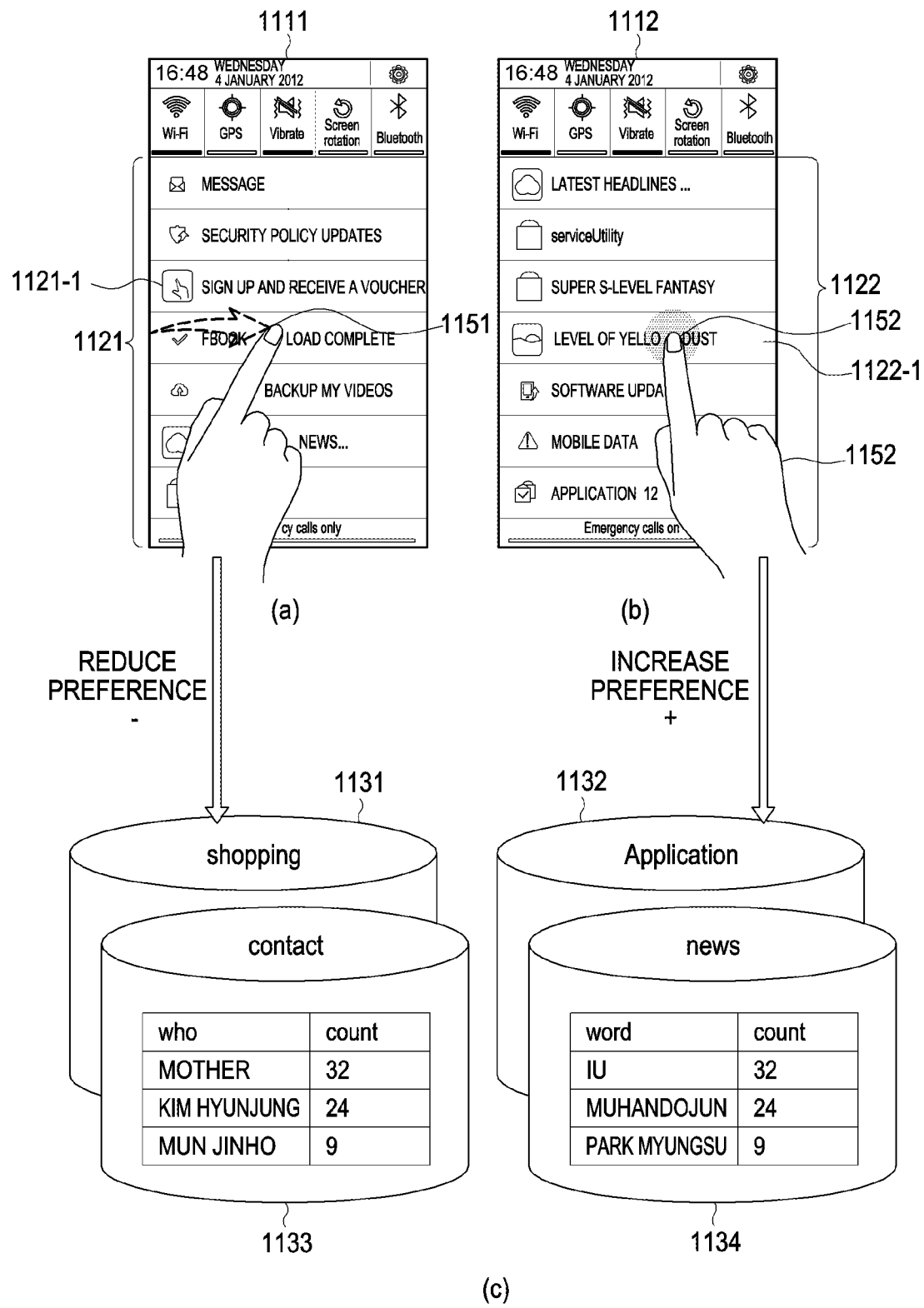
FIG. 11 illustrates an example of updating preference information in an electronic device according to various embodiments.

FIG. 11 illustrates an example of updating preference information in an electronic device according to various embodiments.

In FIG. 11, (a) and (b) show a first screen 1111 and a second screen 1112 that display one or more notifications in a list, and (c) shows an example of the preference DB 411 included in the memory 130 of the electronic device 101.

Referring to (a) of FIG. 11, the display 160 of the electronic device 101 may display a list of notifications, that is, a list 1121 of first graphic elements related to the respective notifications, through the first screen 1111. For example, a user input 1151 for deleting a first graphic element 1121-1 related to a first notification among the first graphic elements may be received by the electronic device 101 as feedback on the first notification (or the first graphic element 1121-1) from the user. In (a) of FIG. 11, it is assumed that the first graphic element 1121-1 related to the first notification is deleted without being checked by the user. The user input 1151 may have, for example, a form of a gesture input (or touch input) of pushing the first graphic element 1121-1 related to the first notification from left to right. The processor 120 of the electronic device 101 may delete the first graphic element 1121-1 related to the first notification from the list 1121 of notifications according to the user input 1151.

According to one embodiment, the processor 120 may reduce preference for an application related to the first notification or for a keyword extractable from the first notification according to the deletion of the first graphic element 1121-1 related to the first notification. Assuming that the first notification is related to shopping, the processor 120 may reduce preference for 'shopping'. Referring to (c) of FIG. 11, the processor 120 may reduce shopping-related preference 1131 among preferences included in the preference DB 411, for example, the shopping-related preference 1131, application-related preference 1132, address book-related preference 1133, and news-related preference 1134, according to the user input 1151.

Referring to (b) of FIG. 11, the display 160 of the electronic device 101 may display a list of notifications, that is, a list 1122 of first graphic elements related to the respective notifications, through the second screen 1112. For example, a user input 1152 for identifying a first graphic element 1122-1 related to a second notification in the list 1122 may be received by the electronic device 101 as feedback on the second notification from the user. The user input 1152 may have, for example, a form of a touch input for clicking on the first graphic element 1122-1 related to the second notification. The processor 120 of the electronic device 101 may control the display 160 to display a second graphic element (not shown) related to the second notification on a separate screen (not shown) other than the second screen 1122 or on a popup window (not shown) according to the user input 1152. According to one embodiment, the processor 120 may execute an application related to the second notification and may display the second graphic element related to the second notification via the application, thereby displaying the second notification.

According to one embodiment, the processor 120 may increase preference for an application related to the second notification or for a keyword extractable from the second notification according to the identification of the first graphic element 1122-1 related to the second notification. Assuming that the second notification is related to news, the processor 120 may increase preference for 'news'. Referring to (c) of FIG. 11, the processor 120 may increase the news-related preference 1134 among preferences included in the preference DB 411, for example, the shopping-related preference 1131, the application-related preference 1132, the address book-related preference 1133, and the news-related preference 1134, according to the user input 1152.

Figure 12A:
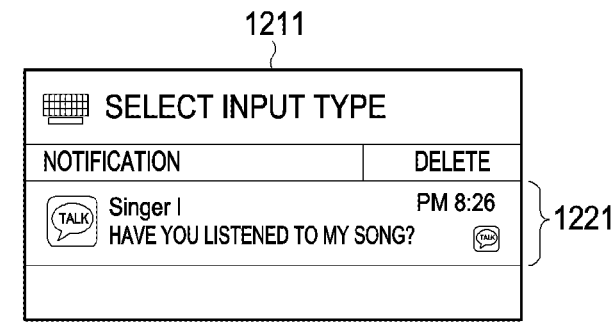
FIGS. 12A and 12B illustrate an example in which an electronic device analyzes a notification according to various embodiments.
Figure 12B:
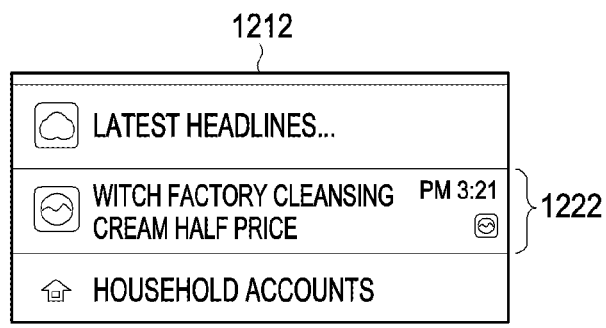

FIGS. 12A and 12B illustrate an example in which an electronic device analyzes a notification according to various embodiments.

(a) of FIG. 12A shows an example of a notification, and (b) of FIG. 12A shows an analysis result obtained by analyzing the notification shown in (a) of FIG. 12A. Referring to (a) of FIG. 12A and (b) of FIG. 12A, a first screen 1211 may display a first notification 1221 generated in relation to a chat application. When a notification occurs as in (a) of FIG. 12A, the processor 120 of the electronic device 101 may analyze the notification, that is, the first notification 1221. Referring to (b) of 12A, the processor 120 of the electronic device 101 may identify analysis results 1231 of the first notification 1221, which are 'com.kakao.talk' as an application filename (pkgName), 'IU: Have you listened to my song?' as the content of the notification (tickerText), '1437521734' as the time at which the notification occurred, and 'posted' as an event that has occurred to the notification. Among the analysis results 1231, 'posted' may indicate that the first notification 1221 has been checked by a user.

(c) of FIG. 12B shows an example of a notification, and (d) of FIG. 12B shows an analysis result obtained by analyzing the notification shown in (c) of FIG. 12B. Referring to (c) of FIG. 12B and (d) of FIG. 12B, a second screen 1212 may display a second notification 1222 generated in relation to a shopping application. When a notification occurs as in (c) of FIG. 12B, the processor 120 of the electronic device 101 may analyze the notification, that is, the second notification 1222. Referring to (d) of 12B, the processor 120 of the electronic device 101 may identify analysis results 1232 of the second notification 1222, which are 'com.coupang.mobile' as an application filename (pkgName), 'Witch Factory Cleansing Cream Half Price: Get Baby Soft Skin only with Cleansing Cream! 3rd Floor, Witch Factory . . . ' as the content of the notification (tickerText), '1437521735' as the time at which the notification occurred, and 'posted' as an event that has occurred to the notification. Among the analysis results 1232, 'removed' may indicate that the second notification 1222 has been deleted without being checked by the user.

Figure 13:
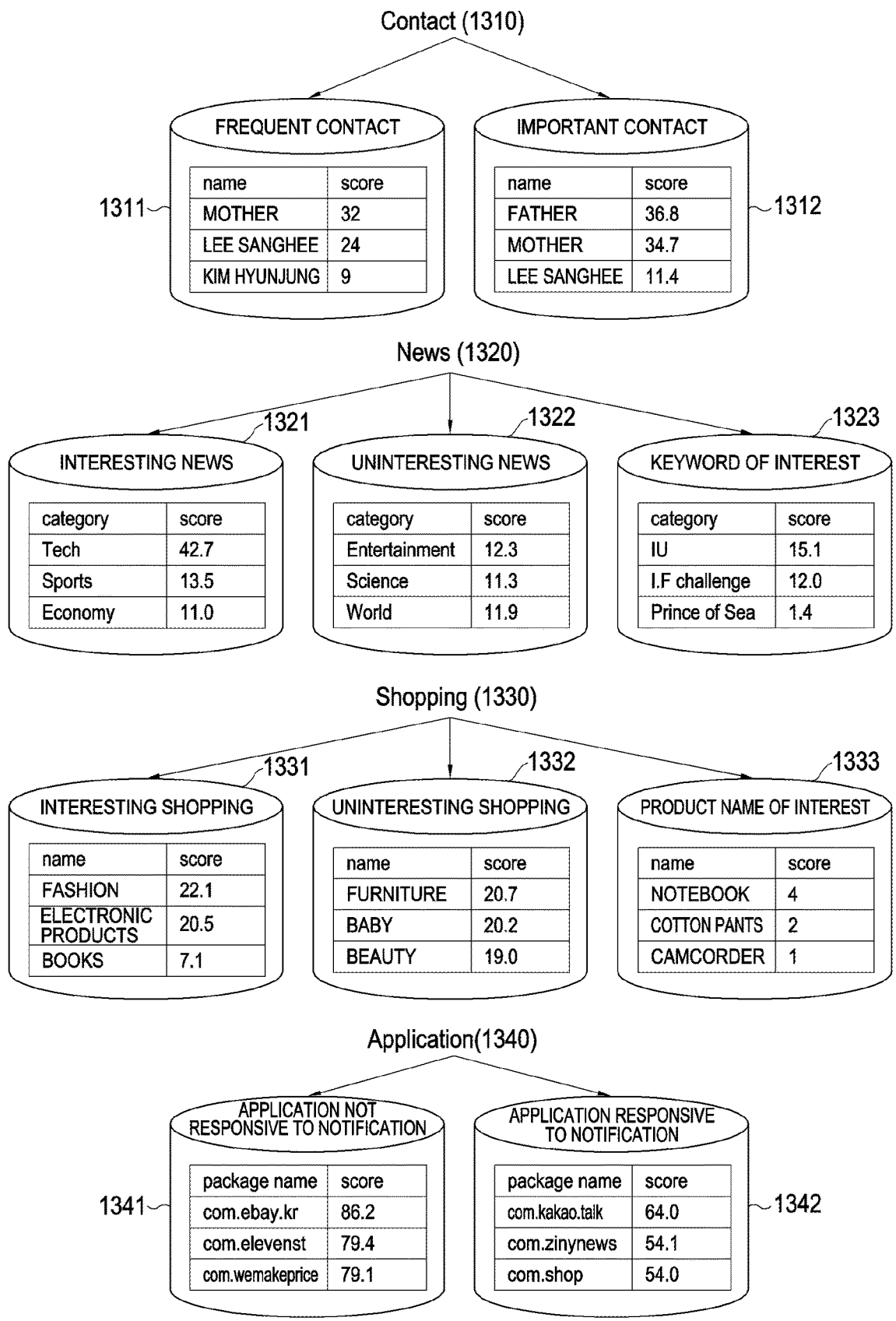
FIG. 13 illustrates an example of a preference DB included in a memory of an electronic device according to various embodiments.

FIG. 13 illustrates an example of a preference DB of an electronic device according to various embodiments.

Referring to FIG. 13, the processor 120 may configure the preference DB 411 to have categories of contact 1310, news 1320, shopping 1330, and application 1340. Further, the categories 1310, 1320, 1330, 1340, and the like may have one or more subcategories 1311, 1312, 1321 to 1323, 1331 to 1333, 1341, 1342, and the like.

Referring to FIG. 13, among the categories, the contact 1310 may be divided into a 'frequent contact' 1311 and an 'important contact' 1312. Items included in subcategories 1311 and 1312 may be, for example, contact names, and per-contact preference indices may be mapped to the respective contact names and may be stored in the preference DB 411.

Referring to FIG. 13, among the categories, the news 1320 may be divided into 'interesting news' 1321, 'uninteresting news' 1322, and a 'keyword of interest' 1323. Items included in subcategories 1321 to 1323 may be, for example, a category name to which each news item belongs or a keyword extractable from each news item. Further, preference indices of individual news categories (for example, Tech, Sports, Economy, Entertainment, Science, World, and the like) or preference for each keyword (for example, IU, Infinite Challenge, Prince, and the like) may be stored in the preference DB 411.

Referring to FIG. 13, among the categories, the shopping 1330 may be divided into 'interesting shopping' 1331, 'uninteresting shopping' 1332 and a 'product name of interest' 1333. Items included in subcategories 1331 to 1333 may be, for example, a category name to which each shopping-related notification belongs or a keyword extractable from each shopping-related notification. Further, preference indices of individual shopping categories (for example, Fashion, Electronic Products, Books, Furniture, Baby, Beauty, and the like) or preference for each keyword (for example, Notebook, Cotton Pants, Camcorder, and the like) may be stored in the preference DB 411.

Referring to FIG. 13, among the categories, the application 1340 may be divided into an 'application not responsive to a notification' 1341 and an 'application responsive to a notification' 1342. Items included in subcategories 1341 and 1342 may be, for example, the filenames (for example, com.ebay.kr.aution, com.elevenst, com.wemakeprice, com.kakao.talk, com.saltlux.zinyenws, com.interpark.shop, and the like) of respective applications in which notifications occur and preference for each filename. The filenames and the corresponding preference may be stored in the DB 411.

FIG. 14 illustrates information on a user-preferred notification by category according to various embodiments.

The processor 120 may analyze notifications occurring in the electronic device 101 or feedback on each of the notifications from the user, thereby determining user-preferred notifications or the fields of the notifications listed in a table 1410 of FIG. 14. Referring to FIG. 14, the processor 120 of the electronic device 101 may determine notifications belonging to categories of news, shopping, movie, game, eating out, and travel/accommodation as user-preferred notifications. In addition, the processor 120 may preferentially display the user-preferred notifications through the display 160.

Referring to the table 1410 of FIG. 14, the processor 120 may determine that the user of the electronic device 101 prefers news in economy, world, science, and IT categories. Further, the processor 120 may recognize through the table 1410 of FIG. 14 that the user prefers news about the user's favorite people (IU, Yoo Ah-in, and Sul Kyung-gu), companies (Samsung, Facebook, Apple, and Twitter), TV shows (Infinite Challenge, Three Meals a Day, and Music Core), and movies (Assassination, Veteran, and Ant-Man).

Referring to FIG. 14, the processor 120 may recognize the user's preferred category of shopping (fashion, furniture, home appliances, computers, and food) and may recognize a particular item (Samsung 24 LED monitor and Jeonggwanjang Red *Ginseng* Extract Limited) that the user desires to buy. Further, the processor 120 may determine a movie (Assassination, Veteran, and Ant-Man) or a movie genre (SF, horror, comedy, and romance) that the user is interested in through the table 1410. The processor 120 may determine a game (Clash of Clans, Friends Pop, and Line Pop 2) or a game genre (action, MMORPG, and shooting games) that the user is interested in through the table 1410. The processor 120 may recognize a restaurant (Mies Container Gangnam and Bongpiyang Gangnam Station) that the user is interested in through the table 1410 and may determine the user's favorite tourist destination (Jeju Island, Sokcho, Cebu, and Beijing) or the user's preferred service type (accommodation, flight, and package tour).

FIGS. 15A to 15C illustrate preference by category or by keyword according to various embodiments. In tables of FIGS. 15A to 15C, 'total count' may indicate the total number of notifications occurring in an application, 'execute' may indicate the number of times notifications are checked by a user, and 'delete' may indicate the number of times notifications are deleted without being checked by a user.

FIG. 15A illustrates a table of information for calculating preference for applications by category in which notifications occur. Referring to the table 1510 of FIG. 15A, each notification may have a category, such as news and shopping, by application. An application with an application filename 'kr.psynet.yhnews' may be classified as a news category. A total of 15 notifications have occurred in the application kr.psynet.yhnews, ten of which have been checked by the user and five of which have been deleted without being checked. The processor 120 of the electronic device 101 may subtract the number of deletions from the number of executions, thereby determining preference for the application. In FIG. 15A, preference for kr.psynet.yhnews may be ten (number of executions) minus five (number of deletions), which is five.

An application with an application filename 'com.saltulx.zinynews' may be classified as a news category. A total of 12 notifications have occurred in the application com.saltulx.zinynews, five of which have been checked by the user and seven of which have been deleted without being checked. Assuming that preference is calculated in the same manner as for the application kr.psynet.yhnews, the processor 120 of the electronic device 101 may determine preference for com.saltulx.zinynews to be −2.

An application with an application filename 'com.interpark.shop' may be classified as a shopping category. A total of ten notifications have occurred in the application com.interpark.shop. Further, assuming that none of the notifications related to the application com.interpark.shop, that is, the ten notifications, has been checked or deleted by the user, the processor 120 of the electronic device 101 may determine preference for the application com.interpark.shop to be 0.

FIG. 15B illustrates a table of information for calculating preference by category for applications in which notifications occur. Referring to the table 1520 of FIG. 15B, each notification may have a category, such as news and shopping, by application. When a total of 11 notifications have occurred to one or more applications included in a category 'POLITICS', ten of which have been checked by the user and one of which has been deleted without being checked, the processor 120 of the electronic device 101 may subtract one (number of deletions) from ten (number of executions), thereby determining preference for the category 'POLITICS' to be 9. When a total of 11 notifications have occurred to one or more applications included in a category 'ENTERTAINMENT', five of which have been checked by the user and six of which have been deleted without being checked, the processor 120 of the electronic device 101 may subtract six (number of deletions) from five (number of executions), thereby determining preference for the category 'ENTERTAINMENT' to be −1.

When a total of ten notifications have occurred to one or more applications included in a category 'ECONOMY', none of which has been checked or has been checked and deleted, the processor 120 of the electronic device 101 may subtract 0 (number of deletions) from 0 (number of executions), thereby determining preference for the category 'ECONOMY' to be 0.

FIG. 15C illustrates a table of information for calculating preference by keyword extracted from each notification. Referring to the table 1530 of FIG. 15C, a keyword extractable from each notification may be, for example, IU, Infinite Challenge, or the like. When a keyword 'IU' can be extracted from a total of 13 notifications, all of which have been checked by the user, the processor 120 of the electronic device 101 may subtract 0 (number of deletions) from 13 (number of executions), thereby determining preference for the keyword 'IU' to be 13. When a keyword 'Infinite Challenge' can be extracted from a total of 20 notifications, 16 of which have been checked by the user and four of which have been deleted without being checked, the processor 120 of the electronic device 101 may subtract 4 (number of deletions) from 16 (number of executions), thereby determining preference for the keyword 'Infinite Challenge' to be 12.

Figure 16A:
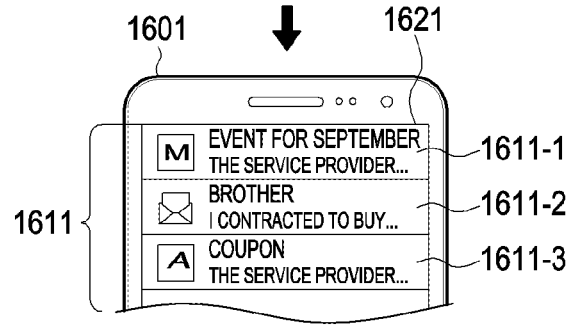
FIGS. 16A, 16B and 16C illustrate an example in which an electronic device displays notifications according to various embodiments.
Figure 16B:
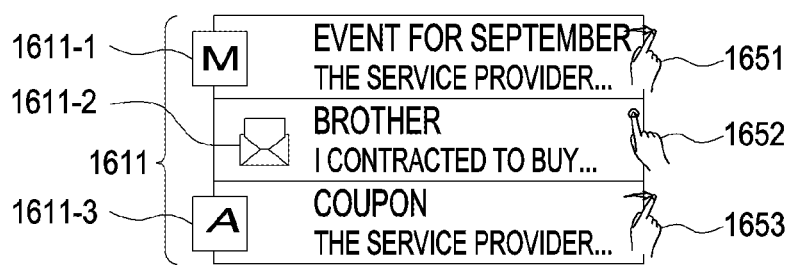
Figure 16C:
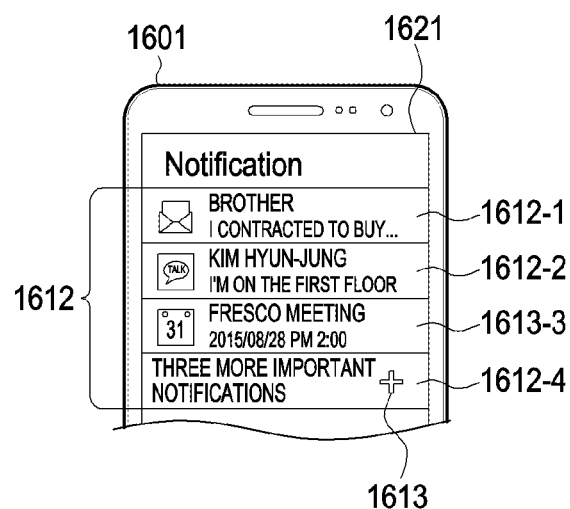

FIG. 16 illustrates an example in which an electronic device displays notifications according to various embodiments.

(a) of FIG. 16 shows an example in which first graphic elements 1611 corresponding to respective notifications are displayed on a display 1621 of an electronic device 1601 in the reverse order in which the notifications occur, (b) of FIG. 16 shows user inputs 1651 to 1653 with respect to the respective first graphic elements 1611, and (c) of FIG. 16 shows an example of displaying the rearranged first graphic elements 1612 on the display 1621.

Referring to (a) and (b) of FIG. 16, the first graphic elements 1611 (1611-1, 1611-2, and 1611-3) corresponding to the respective notifications may be displayed on the display 1621, and the user inputs 1651, 1652, and 1653 with respect to the respective first graphic elements 1611 may be input to the electronic device 1601. In (b) of FIG. 16, it is assumed that a user input 1651 for deleting a first graphic element 1611-1 corresponding to a first notification, a user input 1652 for checking a first graphic element 1611-2 corresponding to a second notification, and a user input 1653 for deleting a first graphic element 1611-3 corresponding to a third notification are input to the electronic device 1601. A processor (for example, the processor 120) of the electronic device 1601 may determine preference for applications related to the respective notifications or for keywords extractable from the respective notifications according to the user inputs 1651 to 1653. The processor (for example, the processor 120) of the electronic device 1601 may rearrange the first graphic elements 1611 corresponding to the respective notifications to reflect the user inputs 1651 to 1653. (c) of FIG. 16 illustrates the result of rearranging the first graphic elements 1611. Referring to (c) of FIG. 16, the display 1621 of the electronic device 1601 may display first graphic elements 1612 (1612-1, 1612-2, and 1612-3) arranged in an order from a first graphic element of a high-preference notification to a first graphic element of a low-preference notification to reflect a user's preference. The display 1621 may also display an object 1612-4 for reporting or displaying the occurrence of additional notifications other than the first graphic elements 1612 corresponding to the respective notifications. When a user input for selecting the object 1612-4 is received, the display 1621 may additionally display a first graphic element or a second graphic element corresponding to the notifications other than the first graphic elements 1612.

Figure 17A:
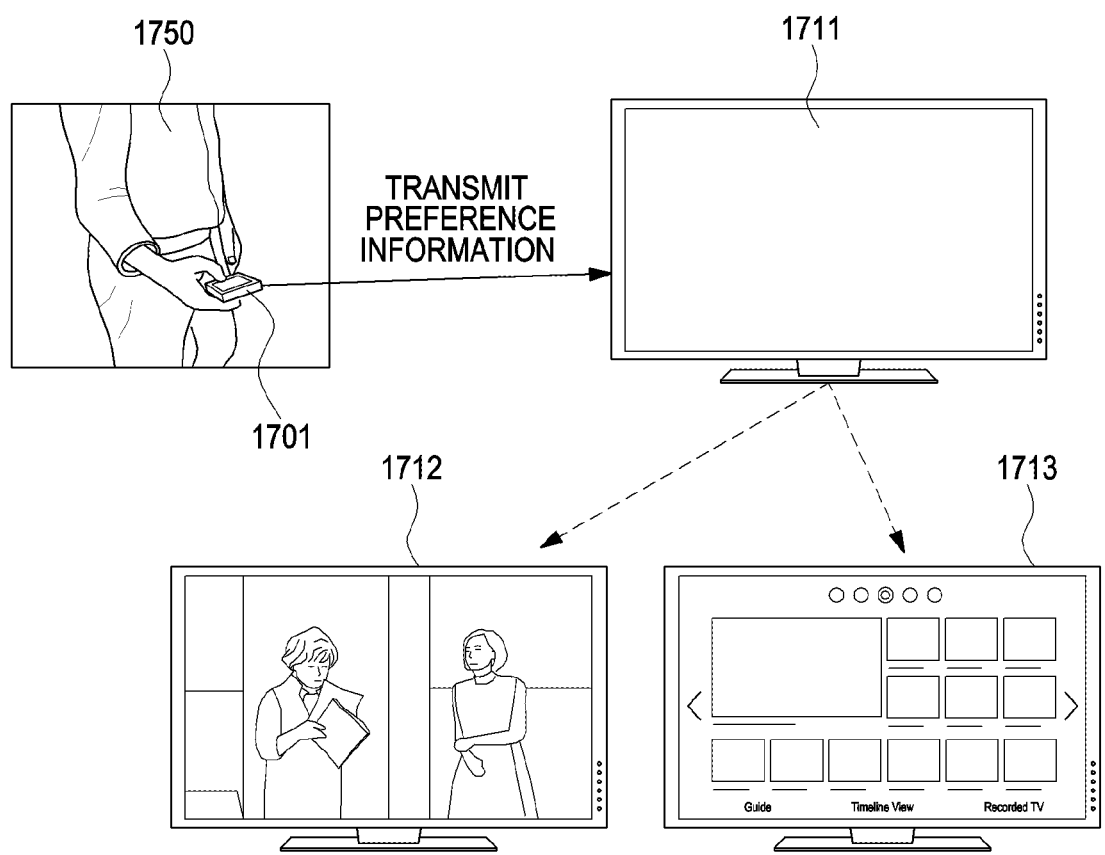
FIGS. 17A and 17B illustrate an example in which an electronic device receives content using preference information according to various embodiments.
Figure 17B:
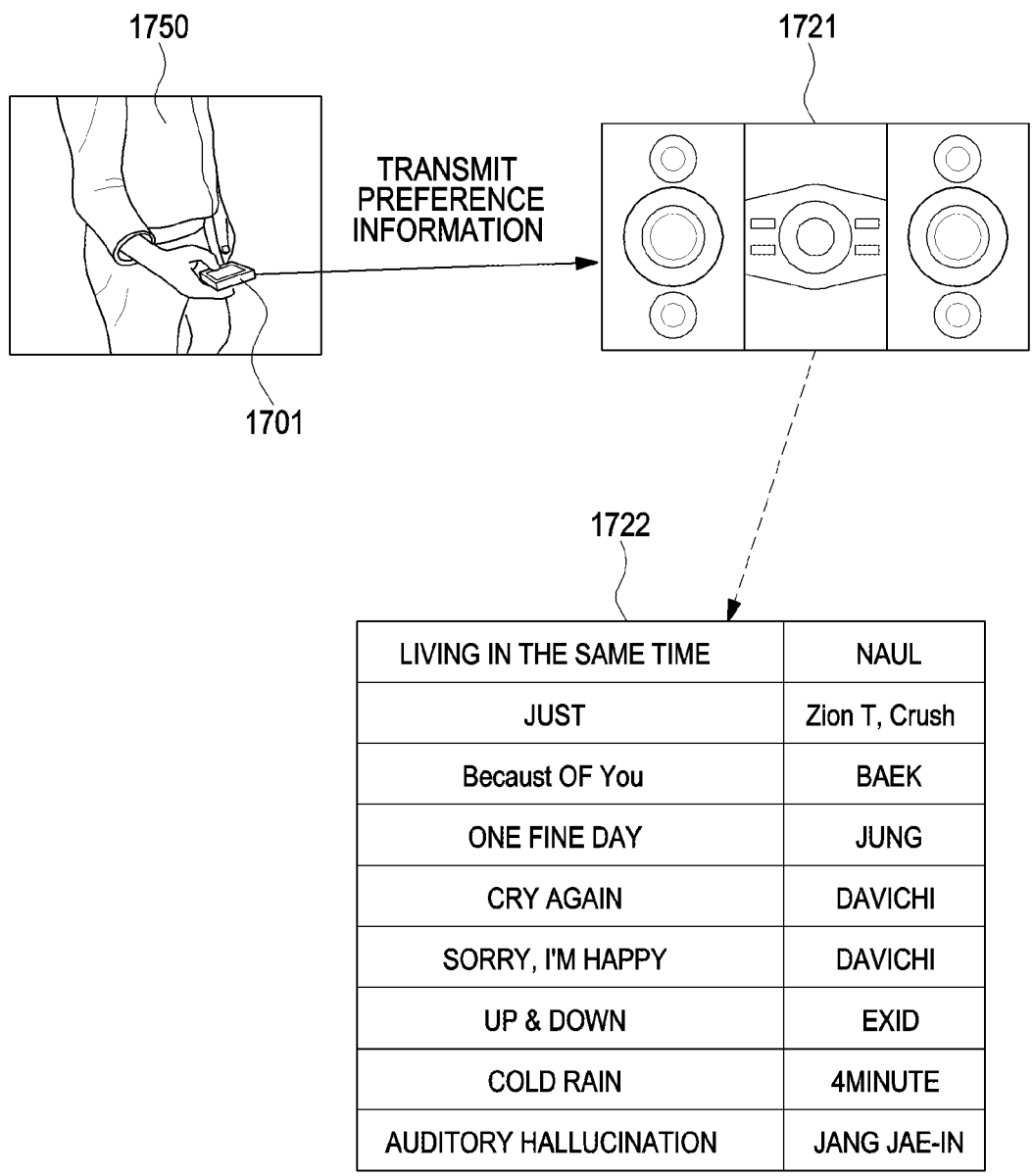

FIGS. 17A and 17B illustrate an example in which an electronic device receives content using preference information according to various embodiments.

Referring to FIG. 17A, the electronic device 1701 may transmit at least part of preference information on a user to an external electronic device 1711. For example, it is assumed that the external electronic device 1711 is a display device as shown in FIG. 17A. When the user desires to receive content using the external electronic device 1711, the electronic device 1701 may transmit at least part of the preference information on the user to the external electronic device 1711, that is, the display device. The external electronic device 1711 may provide the user 1750 with content preferred by the user 1750, for example, a TV program or a movie, on the basis of the preference information. Referring to FIG. 17A, the external electronic device 1711 may display a TV program 1712 preferred by the user 1750 or a list 1713 of TV programs preferred by the user 1750 with reference to the preference information.

According to one embodiment, a processor (for example, the processor 120) of the electronic device 1701 may control the electronic device 1701 to extract preference information related to the external electronic device 1711 from the preference information and to transmit the preference information to the external electronic device 1711. For example, as shown in FIG. 17A, the external electronic device 1711 to which at least part of the preference information is transmitted may be a display device. The processor may control the electronic device 1701 to transmit preference information corresponding to characteristics (for example, video playback) of the display device to the display device. For example, the processor may extract, as at least part of the preference information, video-related keywords (for example, a movie title, a TV program title, a movie genre, a movie actor, and the like) among keywords preferred by the user 1750 or information on video-related applications preferred by the user 1750 and may transmit the video-related keywords or the information on the video-related applications to the external electronic device 1711.

Referring to FIG. 17B, the electronic device 1701 may transmit at least part of preference information on a user to an external electronic device 1721. For example, it is assumed that that the external electronic device 1721 is an audio output device as shown in FIG. 17B. When the user desires to receive content using the external electronic device 1721, the electronic device 1701 may transmit at least part of the preference information on the user to the external electronic device 1721, that is, the audio output device. The external electronic device 1721 may play and provide content preferred by the user 1750, for example, a song, to the user 1750 on the basis of the preference information. Referring to FIG. 17B, the external electronic device 1721 may generate a list 1722 of songs preferred by the user 1750 with reference to the preference information and may play and output a song according to the list 1722.

According to one embodiment of the present disclosure, a storage medium may store commands, wherein the commands may be configured for at least one processor to perform at least one operation when executed by the at least one processor, the at least one operation including: determining an application related to a notification or a keyword extractable from the notification, when the occurrence of the notification is detected; determining whether feedback on the notification from a user occurs; and determining preference of the user for the application or the keyword on the basis of the feedback.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The invention claimed is:

1. An electronic device comprising:
   a memory; and
   a processor configured to:
   determine an application related to a notification or a keyword extracted from the notification;
   based on the notification being detected, determine whether a user provides a feedback on the notification;
   based on the feedback being provided from the user, store preference information of the user for the application or the keyword in the memory; and
   adjust a position for displaying one or more notifications according to a preference for each of one or more applications or each of one or more keywords,
   wherein the processor is further configured to determine the preference information based on a total count of notifications and a count of feedbacks received from the user according to a plurality of categories.

2. The electronic device of claim 1, wherein the processor is further configured to determine that the user provides the feedback based on a user input for checking the notification.

3. The electronic device of claim 2, wherein the processor is further configured to increase the preference of the user for the application related to the notification or the keyword extracted from the notification.

4. The electronic device of claim 1, wherein the processor is further configured to determine that the user provides the feedback based on a user input for deleting the notification.

5. The electronic device of claim 4, wherein the processor is further configured to decrease the preference of the user for the application related to the notification or the keyword extracted from the notification.

6. The electronic device of claim 1, wherein the processor is further configured to control a display to preferentially display the notification related to an application that has higher preference.

7. The electronic device of claim 6, wherein the processor is further configured to preferentially display the notification related to the application that has a higher preference at a top of a list of notifications.

8. The electronic device of claim 1, wherein the processor is further configured to not display or delete the notification related to an application that has lower preference.

9. The electronic device of claim 8, wherein the processor is further configured to preferentially display the notification related to the application that has a lower preference at a bottom of a list of notifications.

10. The electronic device of claim 1, wherein the processor is further configured to control a display to preferentially display the notification related to a keyword that has higher preference.

11. The electronic device of claim 1, wherein the processor is further configured to not display or delete the notification related to a keyword that has lower preference.

12. A method of an electronic device, the method comprising:
   determining an application related to a notification or a keyword extracted from the notification;
   based on the notification being detected, determining whether a user provides a feedback on the notification;
   based on the feedback being provided from the user, storing preference information of the user for the application or the keyword;
   adjusting a position for displaying one or more notifications according to a preference for each of one or more applications or each of one or more keywords, and
   determining the preference information based on a total count of notifications and a count of feedbacks received from the user according to a plurality of categories.

13. The method of claim 12, wherein the determining whether the user provides the feedback on the notification comprises determining that the user provides the feedback based on a user input for checking the notification, and
   the storing of the preference information of the user for the application or the keyword on the basis of the feedback comprises increasing the preference of the user for the application related to the notification or the keyword extracted from the notification.

14. The method of claim 12, wherein
   the determining whether the user provides the feedback on the notification further comprises determining that the user provides the feedback based on a user input for deleting the notification, and
   wherein the storing the preference information of the user for the application or the keyword on the basis of the feedback comprises decreasing the preference of the user for the application related to the notification or the keyword extractable from the notification.

15. The method of claim 12, wherein the adjusting of the position for displaying the one or more notifications according to the preference for each of the one or more applications or each of the one or more keywords comprises preferentially displaying a notification related to an application that has higher preference, or not displaying or deleting notifications related to an application that has lower preference.

16. The method of claim 12, wherein the adjusting of the position for displaying the one or more notifications according to the preference for each of the one or more applications or each of the one or more keywords comprises preferentially displaying a notification related to a keyword that has higher preference, or not displaying or deleting notifications related to a keyword that has lower preference.

* * * * *